(12) United States Patent
Ohsugi

(10) Patent No.: US 11,356,577 B2
(45) Date of Patent: Jun. 7, 2022

(54) IMAGE FORMING DEVICE AND IMAGE FORMING SYSTEM

(71) Applicant: SHARP KABUSHIKI KAISHA, Sakai (JP)

(72) Inventor: Jitsui Ohsugi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/171,817

(22) Filed: Feb. 9, 2021

(65) Prior Publication Data

US 2021/0258445 A1 Aug. 19, 2021

(30) Foreign Application Priority Data

Feb. 13, 2020 (JP) .............................. JP2020-022458

(51) Int. Cl.
| | |
|---|---|
| *H04N 1/00* | (2006.01) |
| *H04N 1/21* | (2006.01) |
| *H04N 1/32* | (2006.01) |
| *G06F 3/12* | (2006.01) |
| *G06K 15/02* | (2006.01) |

(52) U.S. Cl.
CPC ....... *H04N 1/32641* (2013.01); *H04N 1/0001* (2013.01); *H04N 1/00034* (2013.01); *H04N 1/00082* (2013.01); *H04N 1/00408* (2013.01); *H04N 1/00477* (2013.01); *H04N 1/2104* (2013.01); *H04N 1/32662* (2013.01); *H04N 1/32673* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 6,226,097 | B1 * | 5/2001 | Kimura | G06F 3/1296 358/1.14 |
| 2015/0085314 | A1 * | 3/2015 | Aida | G06F 3/1213 358/1.14 |
| 2017/0353615 | A1 * | 12/2017 | Hasegawa | G06F 3/1273 |
| 2019/0310807 | A1 * | 10/2019 | Yagi | G06F 3/1259 |

FOREIGN PATENT DOCUMENTS

| | | |
|---|---|---|
| JP | 2000-099285 A | 4/2000 |
| JP | 2002-196916 A | 7/2002 |

* cited by examiner

*Primary Examiner* — Beniyam Menberu
(74) *Attorney, Agent, or Firm* — ScienBiziP, P.C.

(57) ABSTRACT

An image forming device includes a communicator that receives a series of image data, a timer that measures a reception time of each of the series of image data, and a storage that temporarily stores the image data received before forming an image based on the series of image data. When the communicator receives image data, and subsequently does not receive the next image data within a predetermined reception time, the controller obtains the time difference between the time of the reception end of the series of image data, and the reception time of the image data last received by the communicator, determines that the last received image data may be incomplete image data when the time difference is greater than or equal to a predetermined time, and determines whether to form an image based on the image data stored in the storage according to the determination.

6 Claims, 19 Drawing Sheets

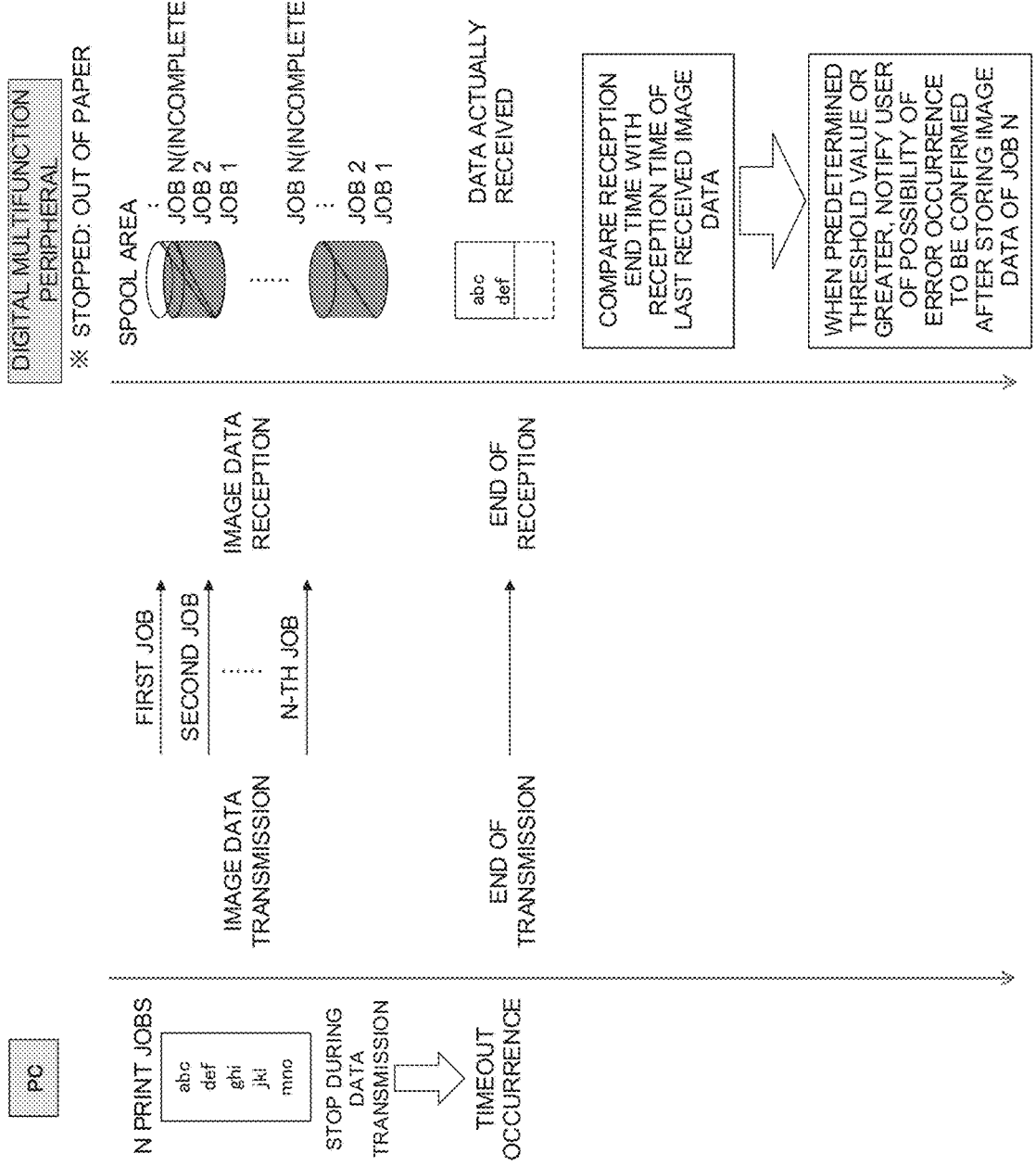

IMAGE FORMING DEVICE AND IMAGE FORMING SYSTEM

BACKGROUND OF THE INVENTION

Field of the Invention

The present invention relates to an image forming device and an image forming system.

Description of the Background Art

Conventionally, in an image forming device such as a multifunction peripheral (MFP), there has been known an image forming device having a function (hereinafter, referred to as a spool function) of temporarily storing image data in a storage area (hereinafter referred to as a spool area), such as a memory or a hard disk drive (HDD), in the MFP before printing and scanning are processed to the image data when the image processing device receives the image data.

While the MFP having the spool function receives image data from an external device such as a personal computer (PC), the processing of receiving the image data by the MFP may stop for reason.

In this case, even if the reception processing of the MFP stops, the PC cannot recognize the reception error in the MFP. Therefore, the PC continues to transmit the image data to the MFP even after that.

Then, when a predetermined time elapses after the PC has transmitted the last image data, the PC automatically ends the transmission processing (timeout).

Thereafter, even when the reception error in the MFP is resolved, and the MFP attempts to resume to receive the image data, the transmission of the image from the PC has been ended. Therefore, the MFP can receive the image data only up to the middle.

As a result, if the received image data is analyzed, and the printing processing and the scan processing are performed to the image data, only the incomplete print result can be obtained. Therefore, the print sheet may be wasted.

Further, the image data may be partially printed, depending on the reception state of the image data. Therefore, there is also a problem that the user does not notice that the image data has not been successfully printed.

In association with such a problem, conventionally, there has been disclosed an invention of an image data transmission device, which has a page checker for checking whether image data of each page is complete as a page (see, for example, Japanese Patent Application Laid-Open No. 2000-99285). The image data transmission device transmits only the image data of the page determined to be complete to the printer. Even if some abnormality occurs during the data transmission, the image data transmission device normally retransmits image data from the page where the abnormality occurs, and prints the complete page.

Further, there has been disclosed an invention of a printing system in which a host computer and a printing device are combined (see, for example, Japanese Patent Application Laid-Open No. 2002-196916). In the printing system, when an abnormality occurs in the printing device after image data is transferred from the host computer to the printing device, the printing system notifies the host computer of the occurrence of the abnormality. The host computer copies the spool of the image data from a volatile memory temporarily storing the spool of the image data to a nonvolatile memory in response to the notification, and retransfers the copied spool data to the printing device after the error in the printing device is recovered. This allows the printing system to continue the printing without forcing the operator to perform a complicated task.

However, in the conventional method of determining each page by the page checker, even if a complete page having image data is transmitted, the image data may not be received correctly due to the problem of the data reception.

Further, even if there is no abnormality in the printing device, image data may be cut off due to the communication trouble or the like. In that case, depending on the location where the image data is cut off, it seems like the image data is normally printed, which is also a problem.

The present invention has been made in consideration of the above-described circumstances, and provides an image forming device and an image forming system that are more convenient for a user than the conventional art by determining a possibility that an error has occurred while image data is received.

SUMMARY OF THE INVENTION (1) An image forming device according to the present invention includes a communicator that sequentially receives a series of image data from an external device via a network, a timer that measures a reception time of each of the series of image data, a storage including a spool area that temporarily stores each of the series of image data, which have been received, before an image is formed based on each of the series of image data, an image generator that forms an image based on each of the series of image data stored in the spool area, and a controller that controls the communicator, the timer, the storage, and the image generator, wherein when the communicator receives image data, and subsequently does not receive the next image data within a predetermined reception time, the controller executes reception end processing for the series of image data, obtains the time difference between the time of the reception end and the reception time of the image data last received by the communicator, determines that there is a possibility that the last received image data is incomplete image data when the time difference is greater than or equal to a predetermined error determination time, and determines whether to cause the image generator to form an image based on the image data according to the result of the determination.

Also, an image forming system according to the present invention includes, an external device, and an image forming device connected to the external device via a network, wherein the external device includes a device operator that receives an image forming instruction from a user, a device communicator that transmits a series of image data related to the image forming instruction to the image forming device, a device display that displays a notification to a user, and a device controller that controls the device operator, the device communicator, and the device display, wherein the image forming device includes a communicator that receives a series of image data related to the image forming instruction from the external device via the network, a timer that measures a reception time of each of the series of image data, a storage including a spool area that temporarily stores each of the series of image data, which have been received, before an image is formed based on each of the series of image data, an image generator that forms an image based on each of the series of image data stored in the spool area, and a controller that controls the communicator, the timer, the storage, and the image generator, wherein when the communicator does not receive next image data within a predetermined reception time predetermined by the communicator, the controller executes reception end processing for the series of image data, obtains the time difference between the time of the reception end and the reception time of the image data last received by the communicator, determines that there is a possibility that the last received image data is incomplete image data when the time difference is greater than or equal to a predetermined error determination time, determines whether to cause the image generator to form an image based on the image data according to the result of the determination, and causes the communicator to transmit an error notification to the external device, and wherein the device controller causes the device display to display the error notification received by the device communicator from the image forming device.

In the present invention, the "image forming device" is a device that forms and outputs an image, such as a copier or multifunction peripheral having a copy function such as a printer using an electrophotographic method for image formation with toner, or a multifunction peripheral (MFP) also including a function other than the copy function.

In the present invention, the "series of image data" may include not only a plurality of image data but also only one image data.

The present invention determines a possibility that an error has occurred while image data is received, and determines whether to form an image based on the image data in accordance with the determination result, as a result, realizes an image forming device and an image forming system which are more convenient for a user than the conventional art.

Further, preferred embodiments of the present invention will be described.

(2) When the controller determines that there is a possibility that the image data is incomplete image data, the controller may cause the communicator to transmit an error notification to the external device, and delete the image data from the storage without forming an image of the image data.

This allows to notify the user that an error during reception of the image data may have resulted in an incomplete print result, and delete the image data to reduce wasteful printing. Therefore, the present invention can realize an image forming device that is more convenient for the user than the conventional art.

(3) When the controller determines that there is a possibility that the image data is incomplete image data, the controller may cause the communicator to transmit an error notification to the external device, and cause the image generator to form an image based on the image data.

This allows to notify the user that an error during reception of the image data may have resulted in that the printed image is an incomplete print result. Therefore, the present invention can realize an image forming device that is more convenient for the user than the conventional art.

(4) When the controller determines that there is a possibility that the image data is incomplete image data, the controller may store the image data as hold image data in the storage, and cause the communicator to transmit an error notification to the external device.

The "hold image data" is image data that is held in the storage without being immediately printed.

This allows to notify the user of the external device that an error during reception of the image data may have resulted in an incomplete print result. Therefore, it is possible to reduce wasteful printing by storing the image data in the storage as the hold image data without printing the image data. Therefore, the present invention can realize an image forming device that is more convenient for the user than the conventional art.

(5) The image forming device may further include an operator that receives an operation of a user, and a display that displays a message to the user, wherein when the operator receives an instruction indicating that an image should been formed based on the hold image data, the controller may cause the display to display an error notification, and then cause the image generator to form an image based on the hold image data.

This allows to notify the user that an error during reception of the image data may have resulted in an incomplete print result. Further, it is possible to reduce wasteful printing by printing the hold image data. Therefore, the present invention can realize an image forming device that is more convenient for the user than the conventional art.

BRIEF DESCRIPTION OF THE DRAWINGS

FIG. 20 is an explanatory diagram illustrating an example of printing processing of the digital multifunction peripheral according to the third embodiment of the present invention.

DESCRIPTION OF THE PREFERRED EMBODIMENTS

Hereinafter, the present invention will be described in more detail with reference to the drawings. Note that the following description is illustrative in all respects and should not be construed as limiting the present invention.

First Embodiment

Figure 1:
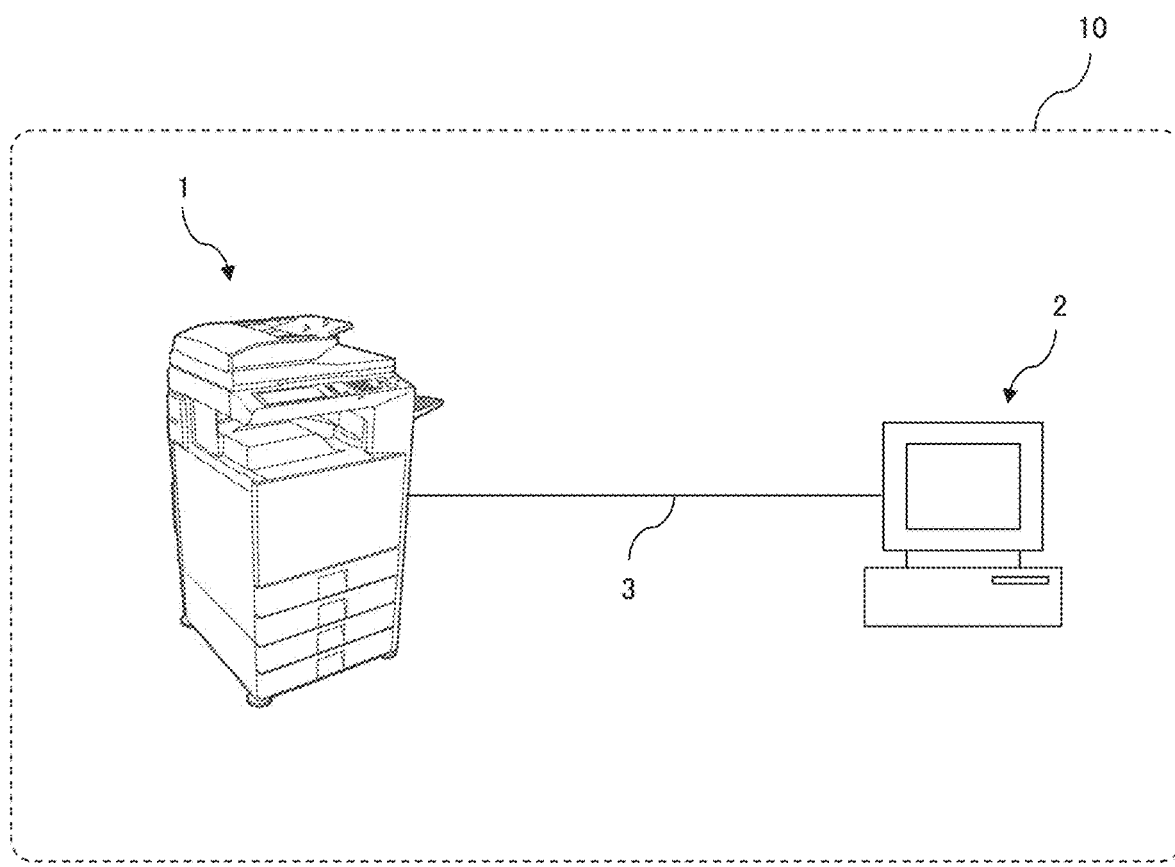
FIG. 1 is an explanatory diagram illustrating an example of a configuration of an image forming system of the present invention.
Figure 2:
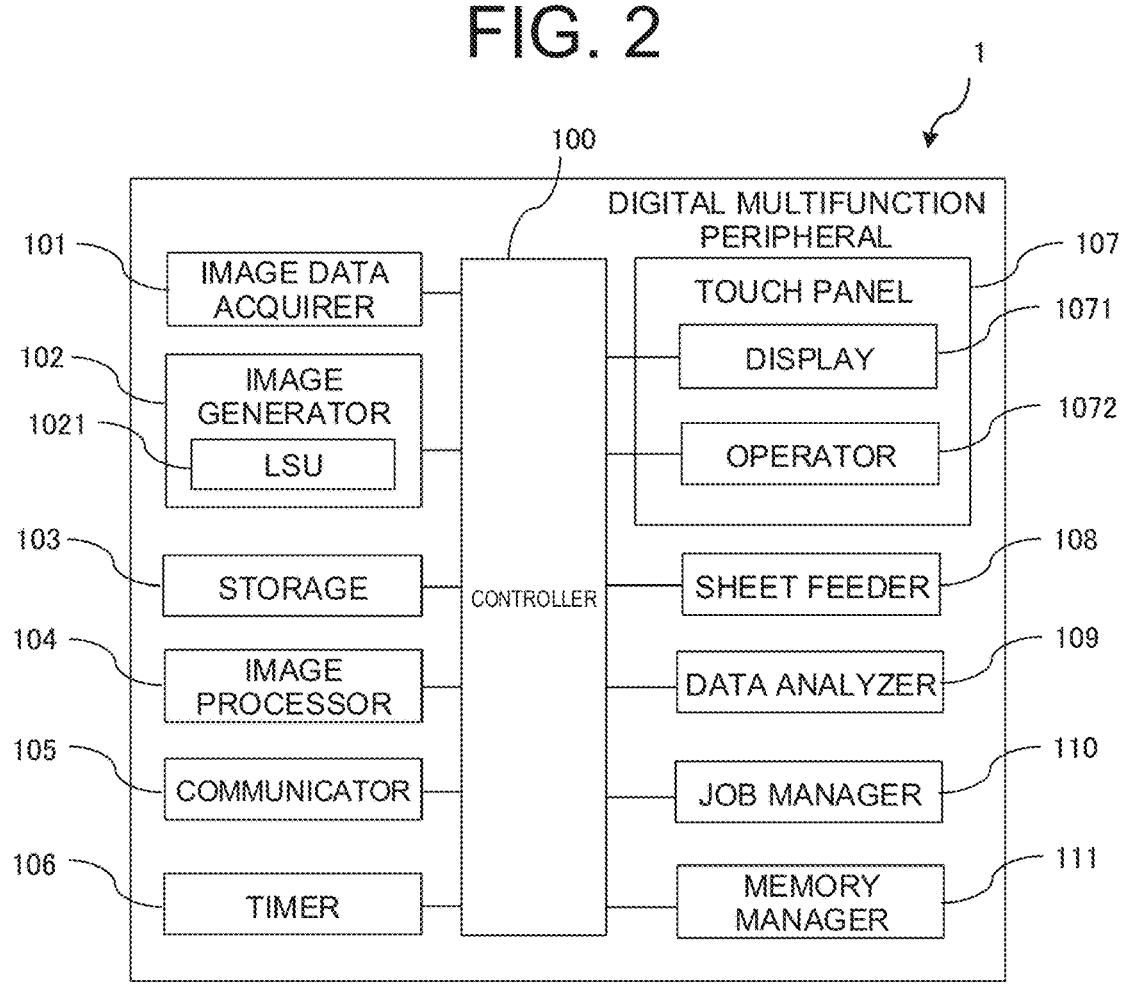
FIG. 2 is a block diagram illustrating a schematic configuration of a digital multifunction peripheral in FIG. 1.

With reference to FIGS. 1 and 2, a schematic configuration of a digital multifunction peripheral 1 which is an embodiment of an image forming device according to the present invention will be described.

FIG. 1 is an explanatory diagram illustrating an example of a configuration of an image forming system 10 according to the present invention. Further, FIG. 2 is a block diagram illustrating a schematic configuration of the digital multifunction peripheral 1 of FIG. 1.

As illustrated in FIG. 1, the image forming system 10 of the present invention includes a digital multifunction peripheral 1 and a personal computer (PC) 2, which are connected to each other via a network 3.

The digital multifunction peripheral 1 is a device that executes digital processing of image data, and has a copy function, a printer function, a scanner function, and a facsimile function. The digital multifunction peripheral 1 is a device such as a multifunctional device or a multifunction peripheral (MFP).

As illustrated in FIG. 2, the digital multifunction peripheral 1 includes a controller 100, an image data acquirer 101, an image generator 102, a storage 103, an image processor 104, a communicator 105, a timer 106, a touch panel 107, a sheet feeder 108, a data analyzer 109, a job manager 110, and a memory manager 111.

Hereinafter, each component of the digital multifunction peripheral 1 will be described.

The controller 100 integrally controls the digital multifunction peripheral 1. The controller 100 has a central processing unit (CPU), a random access memory (RAM), a read only memory (ROM), various interface circuits, and the like.

The controller 100 monitors and controls the detection from each sensor, and all loads such as a motor, a clutch, and the touch panel 107, in order to control the entire operation of the digital multifunction peripheral 1.

The image data acquirer 101 is a part that detects and reads a document, which is placed on a document table or conveyed from a document tray, and generates image data.

Further, the image data acquirer 101 is a part that acquires image data generated by an external device such as the PC 2 through the wired or wireless network 3.

The image generator 102 is a part that prints out image data, which is acquired by the image data acquirer 101 and processed by the image processor 104, on a sheet. The image generator 102 includes a laser scanning unit (LSU) 1021.

The LSU 1021 is a device that forms an electrostatic latent image by irradiating the surface of a photoconductor drum in a charged state with laser light corresponding to the information of image data composed of digital signals.

The storage 103 is an element or a storage medium that stores information necessary for realizing various functions of the digital multifunction peripheral 1, a control program, and the like. For example, the storage 103 is a storage medium such as a semiconductor element like a RAM or a ROM, a hard disk, a flash storage, or a solid state drive (SSD).

The storage 103 stores data necessary for executing a job, such as information and image data related to a job such as printing.

Note that a program and data may be held in different devices, such that the area for holding the data is configured by a hard disk drive and the area for holding the program is configured by a flash storage.

The image processor 104 is a part, which converts image data input from the image data acquirer 101 into an appropriate electric signal, and processes the image data to appropriately output the image data such as enlargement or reduction of the image data, based on the analysis result of a job instruction such as printing acquired through the communicator 105.

The communicator 105 is a part that communicates with the external PC 2 via the network 3, and acquires a job instruction such as printing, document image data, and the like.

Further, the communicator 105 is a part that communicates with another image forming device, a portable information terminal, an information processing device, a facsimile device, and the like, and transmits and receives various information such as an e-mail and a facsimile to and from the external device.

The timer 106 is a part that measures and counts time, and acquires a clock time through the built-in clock or the network 3, for example.

The touch panel 107 is provided so as to overlap with a display panel configured by a liquid crystal panel or the like. The touch panel 107 is configured by a touch panel with a capacitive type or the like which detects the position touched by a finger. The touch panel 107 includes a display 1071 and an operator 1072.

The display 1071 is a part that displays various kinds of information.

The display 1071 is configured by, for example, a cathode-ray tube (CRT) display, a liquid crystal display, an electro luminescence (EL) display, or the like, and is a display device such as a monitor, a line display, or the like for displaying electronic data such as the processing status of an operating system or application software.

The controller 100 displays the operation and the state of the digital multifunction peripheral 1 through the display 1071.

The operator 1072 is an interface for operating the digital multifunction peripheral 1, and is a part that receives an instruction from the user.

The sheet feeder 108 is a part that conveys a sheet stored in the sheet feed cassette or the manual feed tray to the image generator 102.

The data analyzer 109 is a part that analyzes information included in a job instruction such as printing received from the PC 2 through the communicator 105.

The data analyzer 109 analyzes print information included in the job instruction, and also analyzes the data necessary for printing, such as the type of the job, the designation of the number of copies to be printed, the size and type of the print sheet, and the designation of the print tray.

The job manager 110 is a part that manages a job such as printing received through the communicator 105 and a job received by the touch panel 107.

The job manager 110 stores data related to a job in the storage 103, as necessary.

The memory manager 111 is a part that manages the storage capacity of the storage 103 including a work area.

The memory manager 111 also manages a spool area for temporarily storing data related to a job such as printing received from the communicator 105.

The PC 2 transmits image data to the digital multifunction peripheral 1 through the network 3, and the digital multifunction peripheral 1 executes a job such as printing.

Schematic Configuration of PC 2

Next, the schematic configuration of the PC 2 will be described with reference to FIG. 3.

Figure 3:
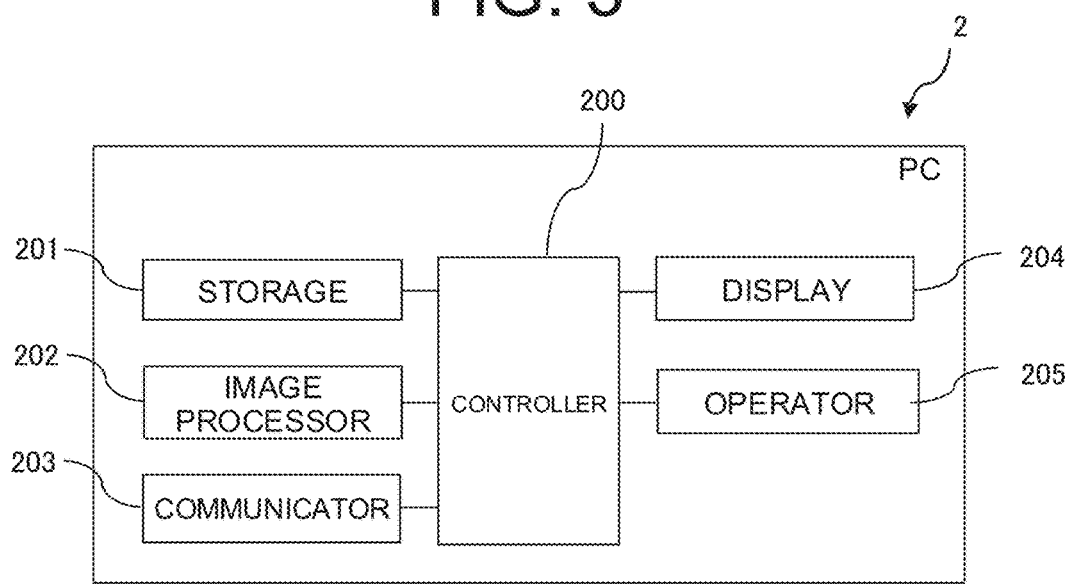
FIG. 3 is a block diagram illustrating a schematic configuration of a PC in FIG. 1.

FIG. 3 is a block diagram illustrating the schematic configuration of the PC 2 in FIG. 1.

As illustrated in FIG. 3, the PC 2 includes a controller 200, a storage 201, an image processor 202, a communicator 203, a display 204, and an operator 205.

Note that the controller 200, the storage 201, the image processor 202, the communicator 203, the display 204, and the operator 205 have the same configurations as the controller 100, the storage 103, the image processor 104, the communicator 105, the display 1071, and the operator 1072 in FIG. 2, respectively. Therefore, the description thereof will be omitted.

Example of Image Data Transmission Processing in PC 2 According to First Embodiment of Present Invention Next, an example of image data transmission processing of the PC 2 according to a first embodiment of the present invention will be described with reference to FIG. 4.

Figure 4:
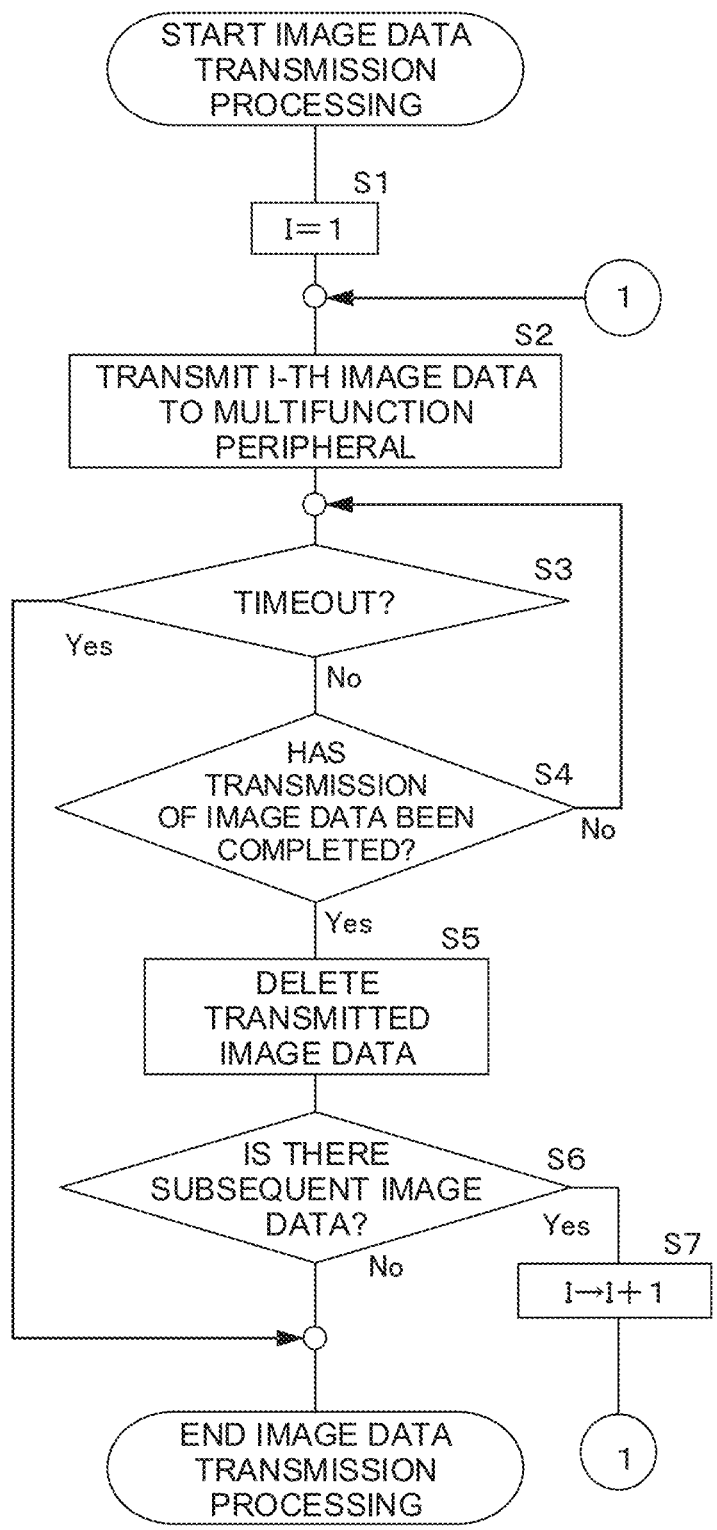
FIG. 4 is a flowchart illustrating a flow of image data transmission processing of the PC in FIG. 1.

FIG. 4 is a flowchart illustrating a flow of image data transmission processing of the PC 2 in FIG. 1.

First, the image data transmission processing of the PC 2 when the PC 2 transmits a series of image data to the digital multifunction peripheral 1, and the digital multifunction peripheral 1 executes printing will be described with reference to FIG. 4.

In step S1 of FIG. 4, the controller 200 in the PC 2 sets the counter I to I=1 (step S1).

Subsequently, in step S2, the controller 200 causes the communicator 203 to transmit the I-th image data to the digital multifunction peripheral 1 (step S2).

Next, in step S3, the controller 200 determines whether a predetermined timeout period has elapsed after the image data is transmitted (step S3).

When the predetermined timeout period has elapsed (when the determination in step S3 is Yes), the controller 200 ends the transmission processing for the image data.

On the other hand, when the predetermined timeout period has not elapsed (when the determination in step S3 is No), the controller 200 executes the determination in step S4 (step S4).

Next, in step S4, the controller 200 determines whether the transmission of the image data has been completed (step S4).

When the transmission of the image data is completed (when the determination in step S4 is Yes), the controller 200 deletes the image data transmitted in step S5 (step S5).

Thereafter, the controller 200 executes the processing of step S6 (step S6).

On the other hand, when the transmission of the image data has not been completed (when the determination in step S4 is No), the controller 200 returns the processing to the determination in step S3 (step S3).

Next, in step S6, the controller 200 determines whether there is the subsequent image data (step S6).

When there is the subsequent image data (when the determination in step S6 is Yes), in step S7, the controller 200 sets the counter I to I+1 (step S7), and then returns the processing to step S2 (step S2).

On the other hand, when there is no subsequent image data (when the determination in step S6 is No), the controller 200 ends the transmission processing for the series of image data.

Example of Printing Processing of Conventional Digital Multifunction Peripheral 1

Next, an example of printing processing of a conventional digital multifunction peripheral 1 that receives image data from the PC 2 will be described with reference to FIGS. 5 to 7.

Figure 5:
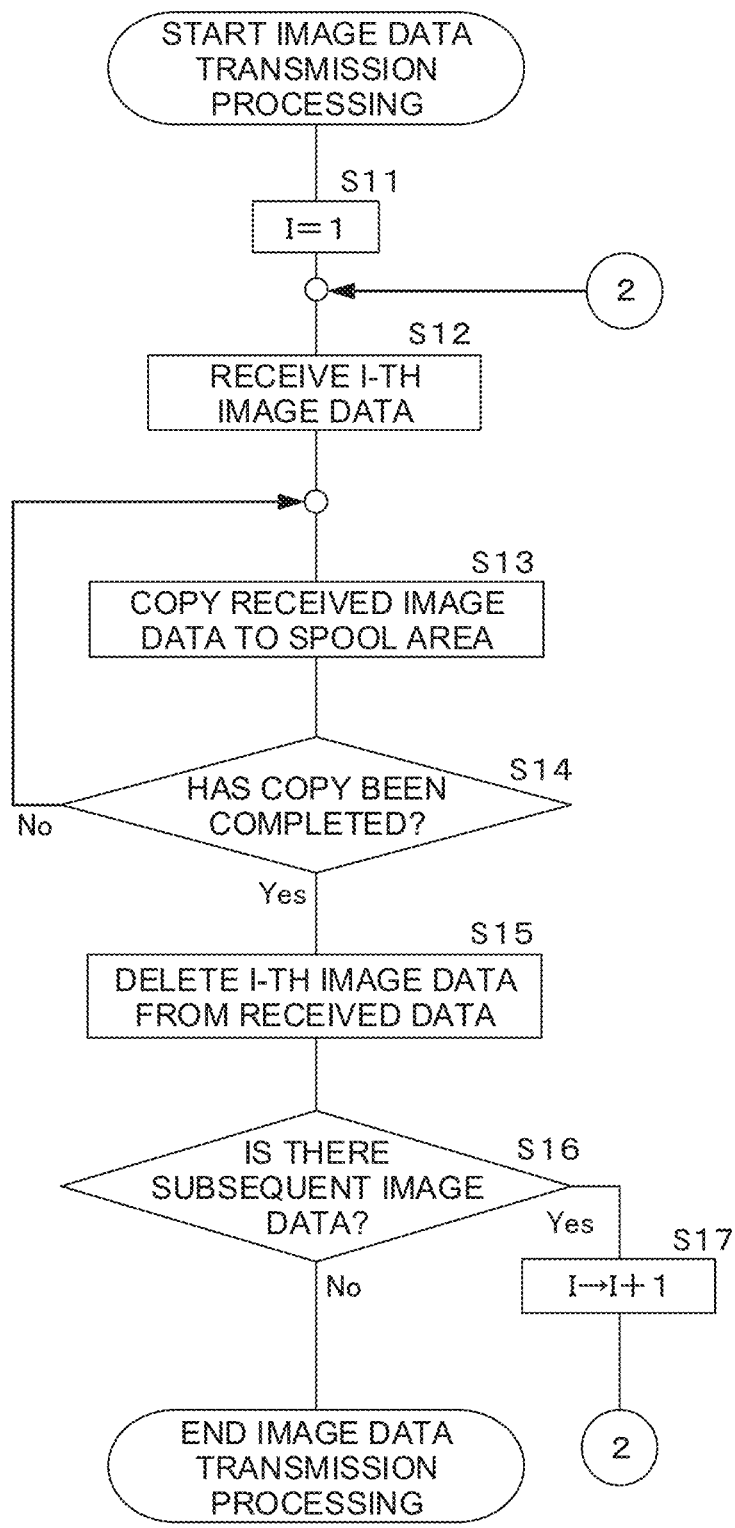
FIG. 5 is a flowchart illustrating a flow of image data transmission processing of a conventional digital multifunction peripheral.

FIG. 5 is a flowchart illustrating a flow of image data reception processing of the conventional digital multifunction peripheral 1.

Figure 6:
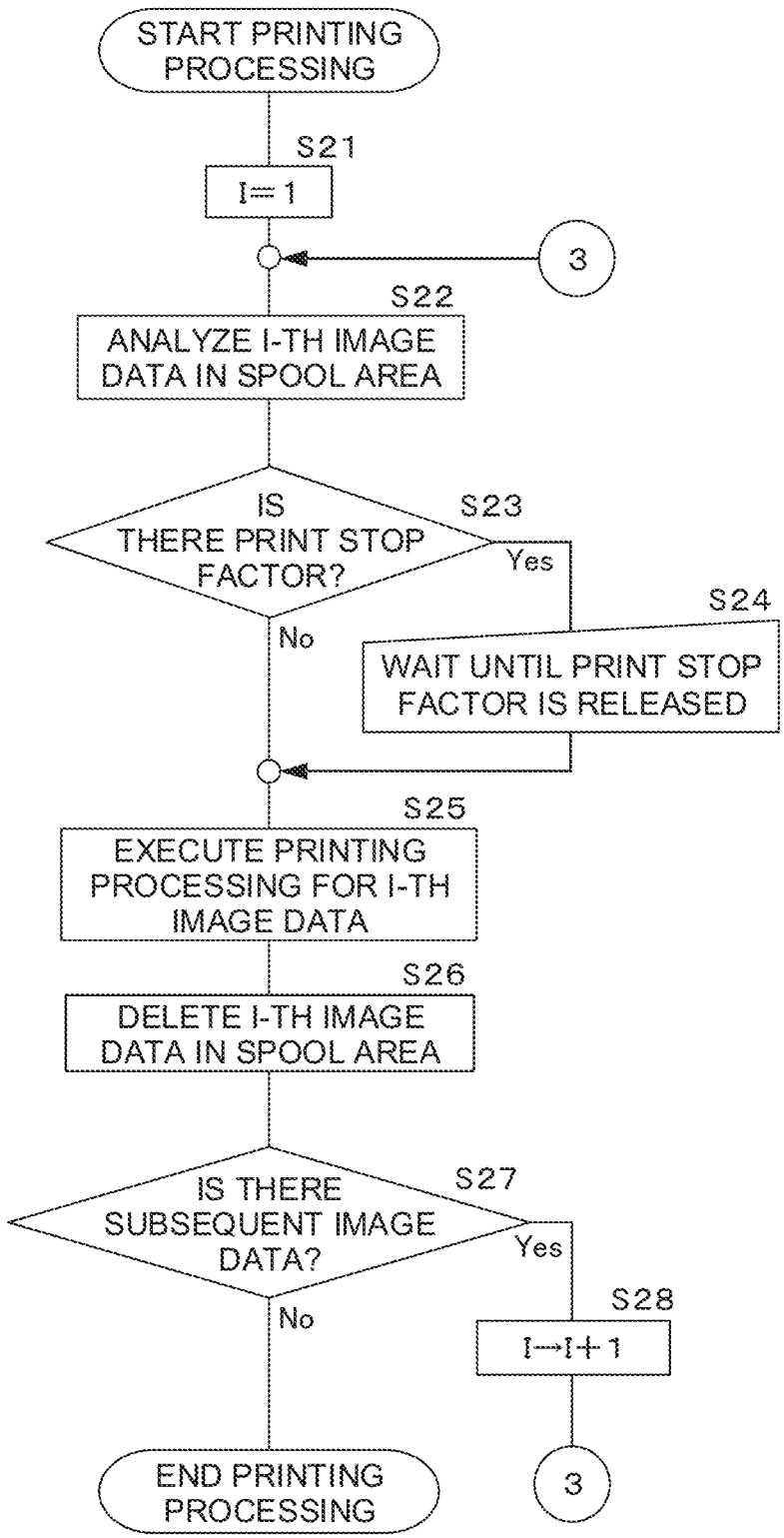
FIG. 6 is a flowchart illustrating a flow of printing processing of the conventional digital multifunction peripheral.

Further, FIG. 6 is a flowchart illustrating a flow of printing processing of the conventional digital multifunction peripheral 1.

In step S11 of FIG. 5, the controller 100 in the digital multifunction peripheral 1 sets the counter I=1 (step S11).

Subsequently, in step S12, the controller 100 receives the I-th image data from the PC 2 (step S12).

Next, in step S13, the controller 100 copies the received image data to the spool area of the storage 103 (step S13).

Subsequently, in step S14, the controller 100 determines whether copying the image data to the spool area has been completed (step S14).

When copying the image data to the spool area has been completed (when the determination in step S14 is Yes), in step S15, the controller 100 deletes the I-th image data from the received data (step S15).

Thereafter, the controller 100 executes the determination in step S16 (step S16).

On the other hand, when copying the image data to the spool area has not been completed (when the determination in step S14 is No), the controller 100 returns the processing to step S13 (step S13).

Next, in step S16, the controller 100 determines whether there is the subsequent image data (step S16).

When there is the subsequent image data (when the determination in step S16 is Yes), in step S17, the controller 100 sets the counter I to I+1 (step S17), and then returns the processing to step S12 (step S12).

On the other hand, when there is no subsequent image data (when the determination in step S16 is No), the controller 100 ends the reception processing for the image data.

After the image data has been received, the controller 100 starts the printing processing.

In step S21 of FIG. 6, the controller 100 in the digital multifunction peripheral 1 sets the counter I to I=1 (step S21).

Subsequently, in step S22, the controller 100 in the digital multifunction peripheral 1 analyzes the I-th image data in the spool area (step S22).

Next, in step S23, the controller 100 determines whether there is a predetermined print stop factor (step S23).

The print stop factor is, for example, a detection of running out of paper, an error caused by a paper jam, a full discharge tray, or the like. These print stop factors are detected by an out-of-paper detection sensor, a paper jam detection sensor, a full-discharge tray detection sensor, and the like, which are not illustrated in the drawings, respectively.

Next, when the controller 100 determines in step S23 that there is a predetermined print stop factor (when the determination in step S23 is Yes), the controller 100 waits until the print stop factor is released in step S24 (step S24).

For example, in case of running out of paper, the controller 100 determines that the print stop factor has been released when a sheet is replenished.

Further, when an error caused by a paper jam and the like has occurred, the controller 100 determines that the print stop factor has been released when the error has been resolved.

Furthermore, when the discharge tray becomes full, the controller 100 determines that the print stop factor has been released when the sheets in the discharge tray have been removed.

When the print stop factor is released in step S24 (step S24), the controller 100 executes the printing processing for the I-th image data in step S25 (step S25).

On the other hand, even when there is no predetermined print stop factor (when the determination in step S23 is No) in step S23, the controller 100 executes the printing processing in step S25 (step S25).

Subsequently, in step S26, the controller 100 deletes the I-th image data in the spool area (step S26).

Next, in step S27, the controller 100 determines whether there is the subsequent image data (step S27).

When there is the subsequent image data (when the determination in step S27 is Yes), the controller 100 sets the counter I to I+1 in step S28 (step S28), and then returns the processing to step S22 (step S22).

On the other hand, when there is no subsequent image data (when the determination in step S27 is No), the controller 100 ends the printing processing.

Next, a problem of the printing processing of the conventional digital multifunction peripheral 1 will be described with reference to FIG. 7.

Figure 7:
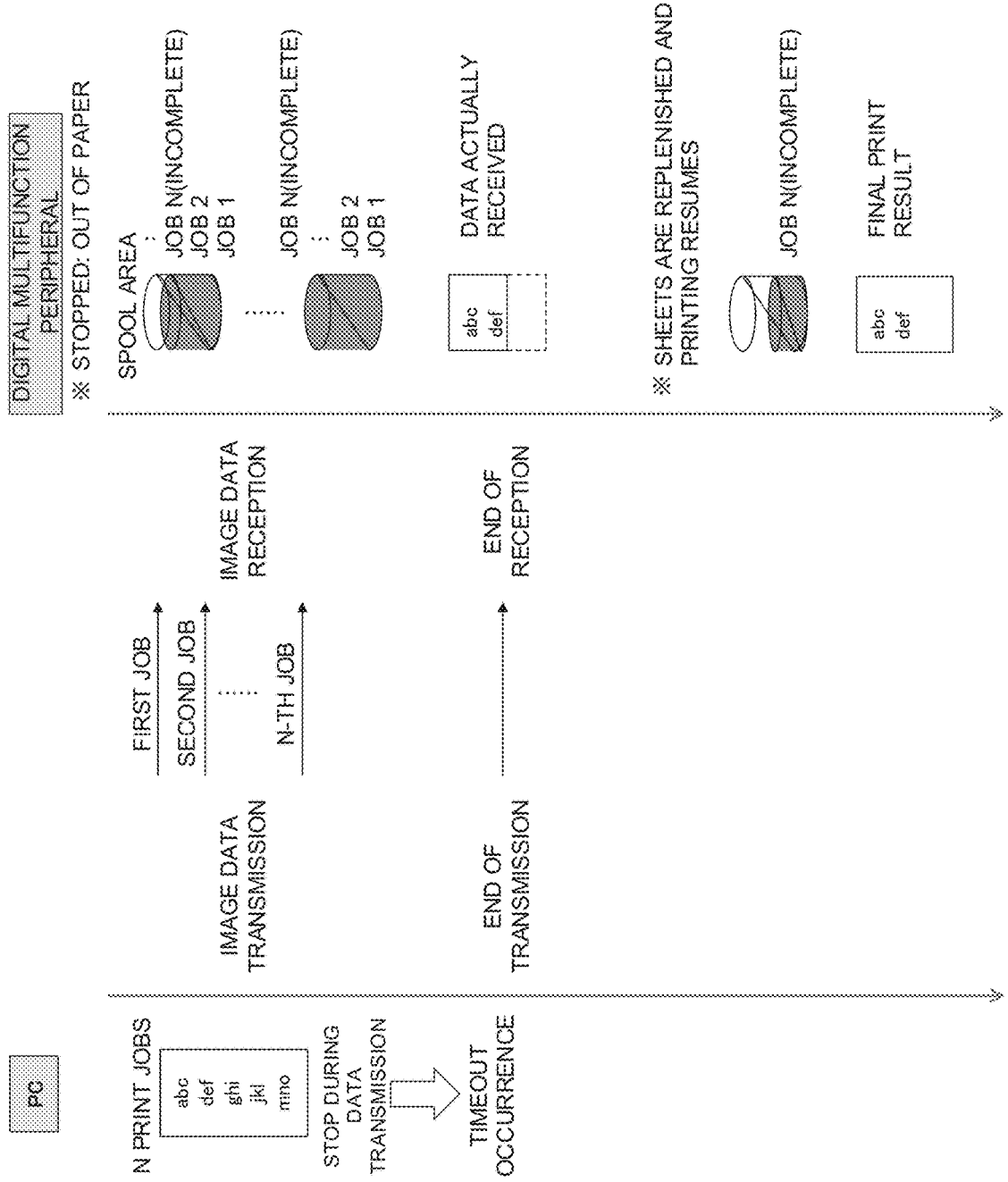
FIG. 7 is an explanatory diagram illustrating an example of printing processing of the conventional digital multifunction peripheral.

FIG. 7 is an explanatory diagram illustrating an example of the printing processing of the conventional digital multifunction peripheral 1.

In the example of FIG. 7, it is assumed that the digital multifunction peripheral 1 is out of paper, and, in this state, a job instructing that a series of images should be continuously printed is transmitted from the PC 2 to the digital multifunction peripheral 1.

In the example of FIG. 7, when the PC 2 transmits image data to the digital multifunction peripheral 1, the communicator 105 in the digital multifunction peripheral 1 starts to receive the image data.

However, since the digital multifunction peripheral 1 is stopped due to running out of paper, the digital multifunction peripheral 1 cannot complete the print job even if the digital multifunction peripheral 1 receives the image data from the PC 2.

Therefore, the digital multifunction peripheral 1 cannot process the received image data. As a result, the image data continues to accumulate in the spool area.

More specifically, as illustrated in FIG. 7, it is assumed that the PC 2 transmits print jobs of the first job to the N-th job (N being a natural number greater than or equal to one) to the digital multifunction peripheral 1.

For convenience of description, in the example of FIG. 7, the N print jobs composed of "ab", "def", "ghi", "jkl", "mno", and the subsequent jobs are illustrated as image data of the first job, and the second job to the N-th job.

Note that, in FIG. 7, the image data of the first job is data of a character string unit. However, the image data of the first job may be data of an arbitrary unit such as a page unit or a document unit.

At this time, when the capacity of the spool area becomes insufficient while the digital multifunction peripheral 1 receives the image data of the N-th job, a state occurs in which the image data of the N-th job is partially stored in the remainder of the spool area.

Therefore, the PC 2 transmits the image data of the N-th job, and thereafter, when the predetermined time has elapsed, the PC 2 ends the transmission processing for the image data due to the timeout.

Thereafter, when sheets are replenished in the digital multifunction peripheral 1, and the error of the printing processing is released, the jobs accumulated in the spool area are processed in order, and a space is created in the spool area.

However, the transmission processing by the PC 2 has already been ended. Therefore, the digital multifunction peripheral 1 cannot receive the data to be received after the N-th job which has been insufficiently received.

As a result, the image data of the N-th job remains as incomplete image data. Therefore, the image of the N-th job is not normally printed.

Note that there is a possibility that a large amount of garbage data is printed depending on how the image data of the N-th job is cut off. Further, there is a possibility that printing of the image data of the N-th job is not recognized as incomplete printing, by partially printing the image data of the N job up to the portion where the printing does not feel unnatural. These possibilities are therefore problematic.

Example of Printing Processing of Digital Multifunction Peripheral 1 According to First Embodiment of Present Invention Next, an example of printing processing of the digital multifunction peripheral 1 according to a first embodiment of the present invention will be described with reference to FIGS. 8 and 9.

Figure 8:
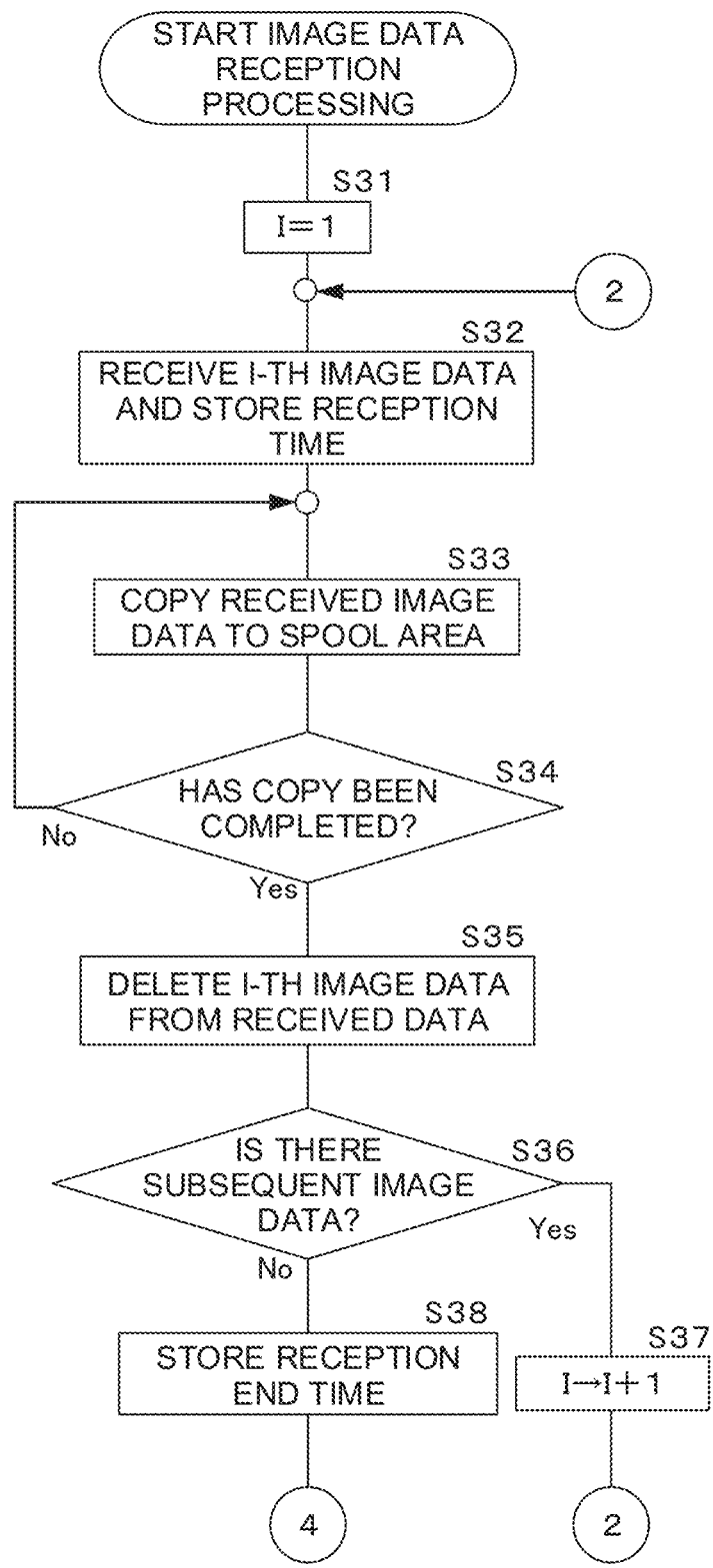
FIG. 8 is a flowchart illustrating a flow of image data transmission processing of the digital multifunction peripheral of FIG. 1.
Figure 9:
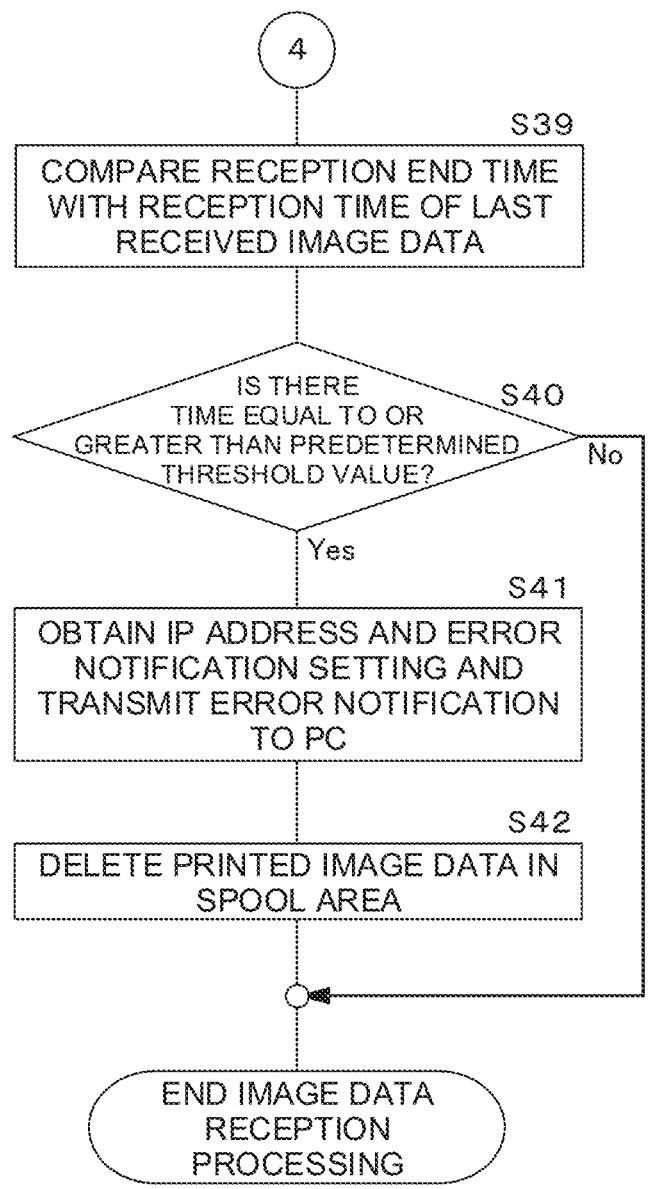
FIG. 9 is a flowchart illustrating a flow of the image data transmission processing of the digital multifunction peripheral of FIG. 1.

FIGS. 8 and 9 are flowcharts illustrating a flow of image data transmission processing of the digital multifunction peripheral 1 in FIG. 1.

Note that since the processing of steps S31 and S33 to S37 of FIG. 8 corresponds to the processing of steps S11, S13 to S17 of FIG. 5, the description thereof will be omitted.

Here, the processing of steps S32 and S38 of FIG. 8 and steps S39 to S42 of FIG. 9, which are not illustrated in FIG. 5, will be described.

The flow of the printing processing of the digital multifunction peripheral 1 is the same as that in FIG. 6. Therefore, the description thereof will be omitted.

In step S31 in FIG. 8, the counter I is set to I=1 (step S31). Thereafter, in step S32, the controller 100 in the digital multifunction peripheral 1 receives the I-th image data (I is a natural number greater than or equal to one) received from the PC 2, acquires the reception time of each image data by the timer 106 in order to check the reception interval between each of the received image data, and stores the received data and the reception time in the storage 103 (step S32).

Note that, when it takes time to receive image data in each of the image data, the reception time of the image data is set to the reception end time of the image data, that is, the last reception time. However, the reception time of the image data may be any time from the start of the reception to the end of the reception.

Next, in step S36, when there is no subsequent image data (when the determination in step S35 is No), the controller 100 determines that the reception of the series of image data has been completed in step S38, and stores the reception end time in the storage 103 (step S38).

Here, when there is no subsequent image data, it is possible to grasp the end of the image data regardless of whether there is the next image data. Therefore, the controller 100 can determine that the acquisition of the image data ends with the last image data that has been received.

Next, in step S39 of FIG. 9, the controller 100 compares the reception end time of the series of image data with the reception time of the last received image data, and calculates the interval between the reception end time and the reception time (step S39 of FIG. 9).

In the following step S40, the controller 100 determines whether the calculated interval is equal to or greater than a predetermined threshold value (for example, 5 minutes. The interval can be arbitrarily set by the user) (step S40).

When the calculated interval is equal to or greater than the predetermined threshold value (when the determination in step S40 is Yes), in step S41, the controller 100 analyzes the head of the image data in the spool area, obtains the IP address and error notification setting, and causes the communicator 105 to transmit an error notification to the PC 2 that has transmitted the image data (step S41).

The error notification is, for example, a notification such as "Since the communication may be disconnected in the middle, it is canceled. Please transmit again."

Thereafter, in step S42, the controller 100 deletes the printed image data in the spool area (step S42), and ends the image data reception processing.

On the other hand, in step S40, when the calculated interval is less than the predetermined threshold value (when the determination in step S40 is No), the controller 100 determines that normal image data has been received, and ends the image data reception processing.

Next, advantages of the printing processing of the digital multifunction peripheral 1 according to the first embodiment of the present invention will be described with reference to FIG. 10.

Figure 10:
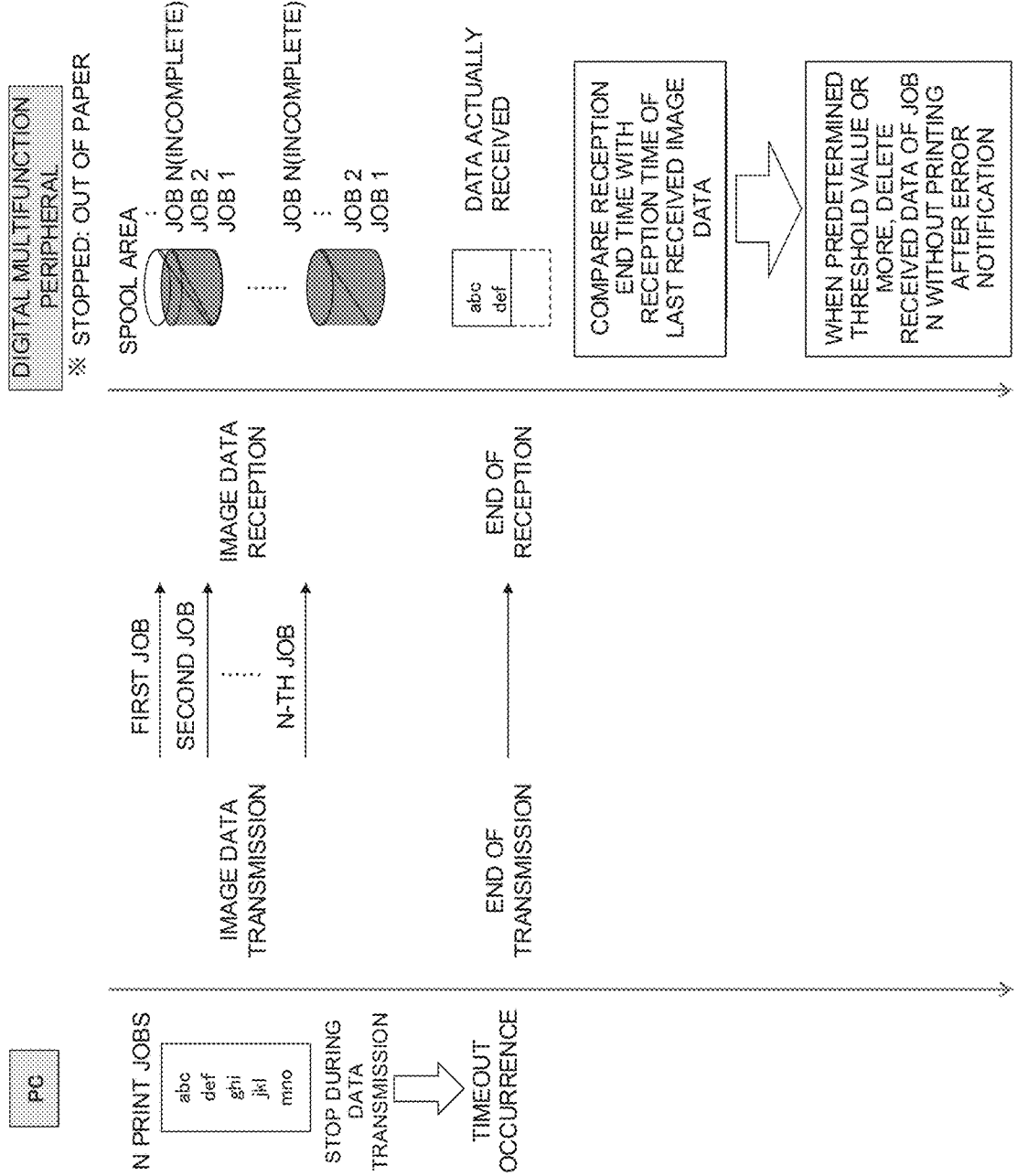
FIG. 10 is an explanatory diagram illustrating an example of printing processing of the digital multifunction peripheral of FIG. 1.

FIG. 10 is an explanatory diagram illustrating an example of the printing processing of the digital multifunction peripheral 1 of FIG. 1.

In the example of FIG. 10, as in the case of FIG. 7, it is assumed that the digital multifunction peripheral 1 is out of paper, and, in this state, a job instructing that a series of images should be continuously printed is transmitted from the PC 2 to the digital multifunction peripheral 1.

In the example of FIG. 10, when the PC 2 transmits image data to the digital multifunction peripheral 1, the communicator 105 in the digital multifunction peripheral 1 starts to receive the image data.

However, since the digital multifunction peripheral 1 is stopped due to running out of paper, the digital multifunction peripheral 1 cannot complete the print job even if the digital multifunction peripheral 1 receives the image data from the PC 2.

Therefore, the digital multifunction peripheral 1 cannot process the received image data. As a result, the image data continues to accumulate in the spool area.

Here, as in FIG. 7, it is assumed that the PC 2 transmits, to the digital multifunction peripheral 1, the N print jobs composed of "abc", "def", "ghi", "jkl", "mno", and the subsequent jobs as image data of the first job, and the second job to the N-th job.

At this time, when the capacity of the spool area is filled while the digital multifunction peripheral 1 receives the image data of the N-th job, a state occurs in which the image data of the N-th job is partially stored in the spool area.

Therefore, according to the first embodiment of the present invention, the controller 100 in the digital multifunction peripheral 1 stores, in the storage 103, the reception time of each image data and the reception end time when the reception of the series of image data is completed, and compares the reception end time and the reception time of the last received image data.

For example, when an interval occurs for a certain time (for example, 5 minutes) or more, and then the digital multifunction peripheral 1 ends to receive the image data, it is highly probable that the data transmission is ended in the state where the timeout has occurred at the PC 2.

At this time, the controller 100 determines that the last received job N is incomplete image data that has been cut off in the middle due to the error during the data reception.

Thereafter, the controller 100 deletes the printed image data in the spool area, so that no incomplete image data remains in the spool area.

On the other hand, the controller 100 analyzes only the head of the job N in the spool area, acquires the source IP address and the error notification setting of the transmission source, and notifies the PC 2 of an error.

As described above, the controller 100 compares the reception end time of a series of image data with the reception time of the last received image data. When the comparison result is equal to or greater than a predetermined threshold value, the controller 100 notifies the user of an error indicating that an error may have occurred while receiving the image data. Then, the controller 100 deletes the received data of the job N without printing the received data. Therefore, it is possible to prevent wasteful printing and to realize the image forming system 10 with more convenience for the user than the conventional art.

Second Embodiment

Next, an example of printing processing of the digital multifunction peripheral 1 according to a second embodiment of the present invention will be described with reference to FIGS. 11 to 14.

Figure 11:
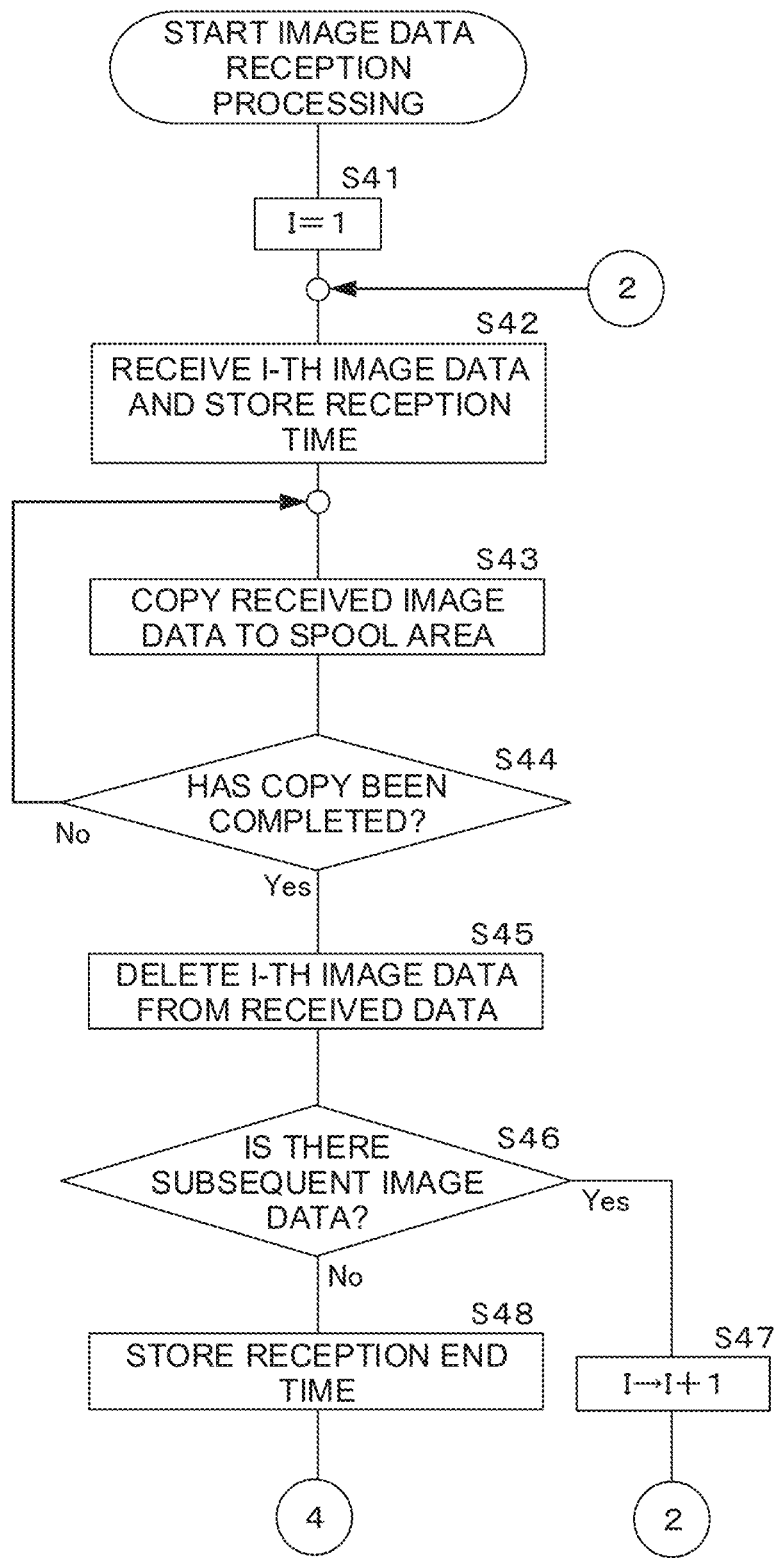
FIG. 11 is a flowchart illustrating a flow of image data transmission processing of a digital multifunction peripheral according to a second embodiment of the present invention.
Figure 12:
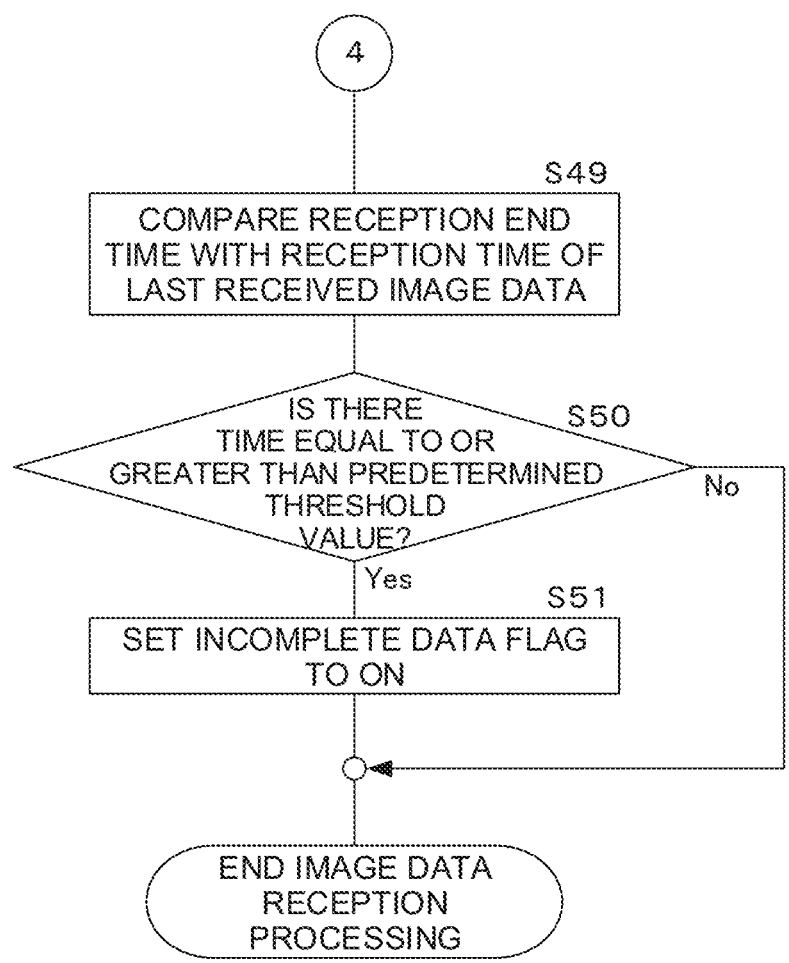
FIG. 12 is a flowchart illustrating a flow of the image data transmission processing of the digital multifunction peripheral according to the second embodiment of the present invention.

FIGS. 11 and 12 are flowcharts illustrating a flow of image data transmission processing of the digital multifunction peripheral 1 according to the second embodiment of the present invention.

Note that the processing of steps S41 to S48 of FIG. 11 and steps S49 and S50 of FIG. 12 corresponds to the processing of steps S31 to S38 of FIG. 8 and steps S39 and S40 of FIG. 9, respectively, and thus the description thereof will be omitted.

Here, the processing of step S51 of FIG. 12, which is not illustrated in FIGS. 8 and 9, will be described.

In step S50 of FIG. 12, when the calculated interval is equal to or greater than a predetermined threshold value (when the determination in step S50 is Yes), the controller 100 determines that it is highly probable that the timeout has occurred at the PC 2, which has ended the data transmission, set an incomplete data flag to the job information of the received image data in step S51 (step S51), and then ends the image data reception processing.

Figure 13:
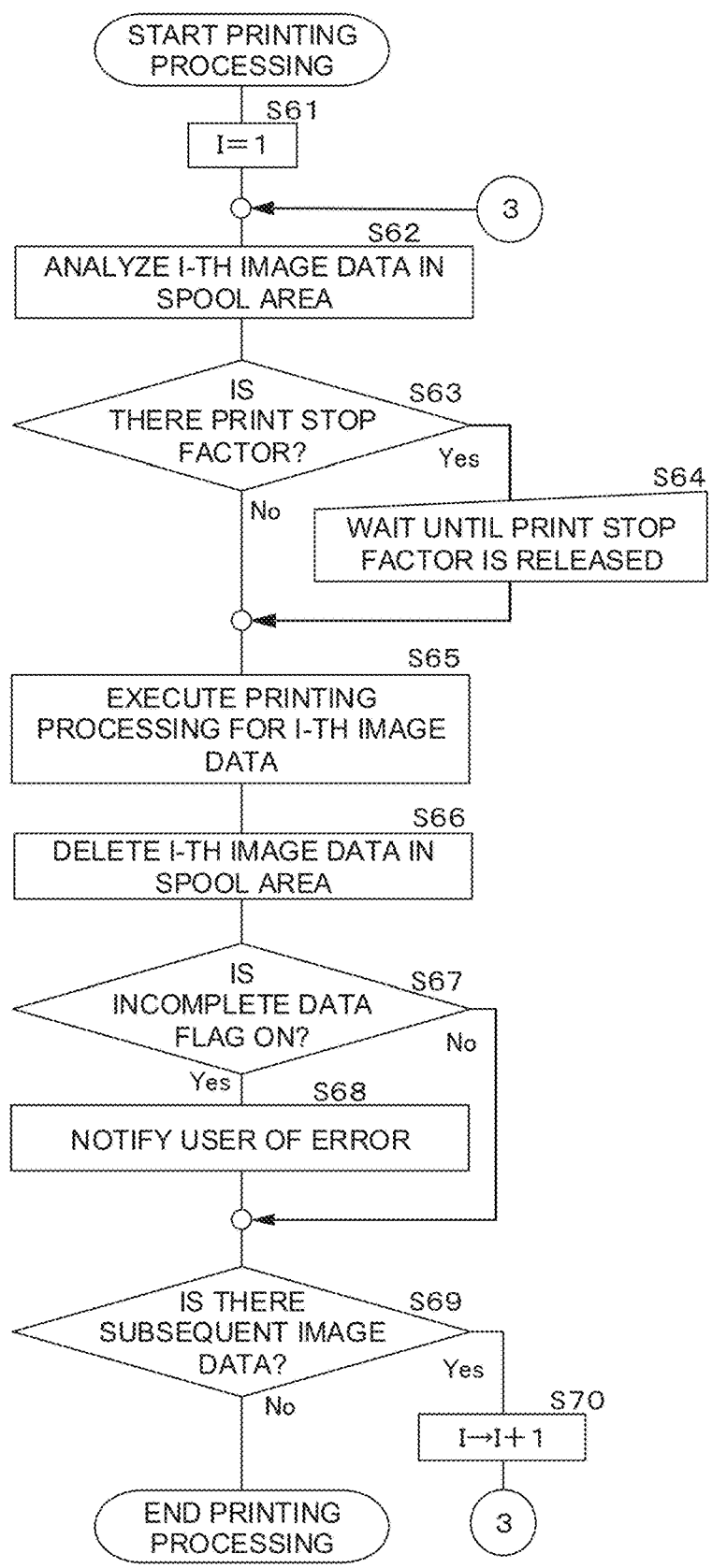
FIG. 13 is a flowchart illustrating a flow of printing processing of the digital multifunction peripheral according to the second embodiment of the present invention.

FIG. 13 is a flowchart illustrating a flow of printing processing of the digital multifunction peripheral 1 according to the second embodiment of the present invention.

Note that the processing of steps S61 to S66 and S69 and S70 of FIG. 13 corresponds to the processing of steps S21 to S28 of FIG. 6, respectively. Therefore, the description thereof will be omitted.

Here, the processing of steps S67 and S68 of FIG. 13, which is not illustrated in FIG. 6, will be described.

In step S66, the controller 100 deletes the I-th image data in the spool area (step S66), and, in the following step S67, the controller 100 determines whether the incomplete data flag is set for the job (step S67).

When the incomplete data flag is set for the job (when the determination in step S67 is Yes), the controller 100 notifies the user of an error in step S68 (step S68).

For example, the controller 100 issues an error notification to the PC 2.

Further, the controller 100 may be designed to notify the display 1071 in the digital multifunction peripheral 1 of an error message, and to cause the image generator 102 to print the error message.

Then, the controller 100 executes the determination in step S69 (step S69).

On the other hand, when the incomplete data flag is not set for the job (when the determination in step S67 is No), the controller 100 determines that the printing is normal, and executes the determination in step S69 (step S69).

Next, printing processing of the digital multifunction peripheral 1 according to the second embodiment of the present invention will be described with reference to FIG. 14.

Figure 14:
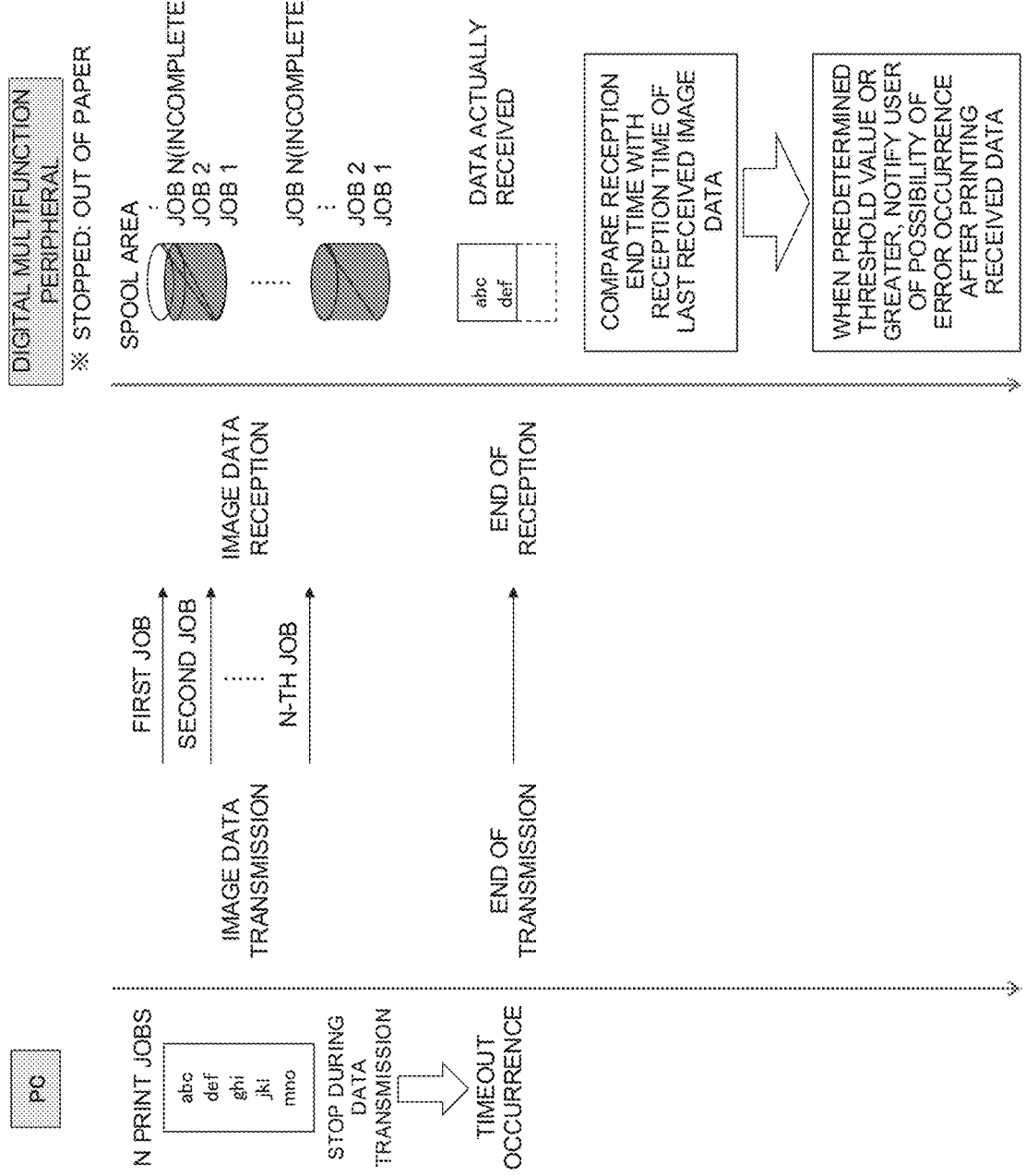
FIG. 14 is an explanatory diagram illustrating an example of the printing processing of the digital multifunction peripheral according to the second embodiment of the present invention.

FIG. 14 is an explanatory diagram illustrating an example of the printing processing of the digital multifunction peripheral 1 according to the second embodiment of the present invention.

In the example of FIG. 14, it is assumed that the digital multifunction peripheral 1 is out of paper as in the case of FIG. 10, and, in this state, a job for continuously printing a series of images is transmitted from the PC 2 to the digital multifunction peripheral 1.

In the example of FIG. 14, when the PC 2 transmits image data to the digital multifunction peripheral 1, the communicator 105 in the digital multifunction peripheral 1 starts to receive the image data.

However, since the digital multifunction peripheral 1 is stopped due to running out of paper, the digital multifunction peripheral 1 cannot complete the print job even if the digital multifunction peripheral 1 receives the image data from the PC 2.

Therefore, the digital multifunction peripheral 1 cannot process the received image data. As a result, the image data continues to accumulate in the spool area.

Here, as in FIG. 10, it is assumed that the PC 2 transmits, to the digital multifunction peripheral 1, the N print jobs composed of "abc", "def", "ghi", "jkl", "mno", and the subsequent jobs as image data of the first job, and the second job to the N-th job.

At this time, when the capacity of the spool area is filled while the digital multifunction peripheral 1 receives the image data of the N-th job, a state occurs in which the image data of the N-th job is partially stored in the spool area.

Therefore, as in the first embodiment of the present invention, the controller 100 in the digital multifunction peripheral 1 stores, in the storage 103, the reception time of each image data and the reception end time when the reception of the series of image data is completed, and compares the reception end time and the reception time of the last received image data.

For example, when an interval occurs for a certain time (for example, 5 minutes) or more, and then the digital multifunction peripheral 1 ends to receive the image data, it is highly probable that the data transmission is ended in the state where the timeout has occurred at the PC 2.

At this time, the controller 100 determines that the last received job N is incomplete image data that has been cut off in the middle due to the error during the data reception.

Thereafter, the controller 100 deletes the printed image data in the spool area, so that no incomplete image data remains in the spool area.

In the second embodiment of the present invention, only the incomplete data flag (user notification is required) is set to the job information for the job N, and the processing is continued.

Thereafter, when sheets are replenished in the digital multifunction peripheral 1, and the error of the printing processing is released, the jobs accumulated in the spool area are processed in order, and a space is created in the spool area.

In this case, the image data of the job N is also analyzed.

As a result, since the incomplete data flag is set to the job information for the job N, the controller 100 determines that there is a possibility of an incomplete print result, and executes any one of the following processing after the job N is printed.

(1) The controller 100 notifies the PC 2 of, for example, a message "The communication may be disconnected in the middle. Please check the print result."

(2) The controller 100 causes the image generator 102 to print a caution notification page (a page on which a message to be notified to the user is printed), and notifies the user of the message.

(3) The controller 100 displays a message on the display 1071, and notifies the user of the message.

As described above, the controller 100 compares the reception end time of a series of image data with the reception time of the last received image data, and as a result, determines that an error may have occurred while receiving the series of image data, and notifies the user that the printed image may be an incomplete print result. Therefore, it is possible to realize the image forming system 10 that is more convenient for the user than the conventional art.

Third Embodiment

Next, an example of printing processing of the digital multifunction peripheral 1 according to a third embodiment of the present invention will be described with reference to FIGS. 15 to 20.

Figure 15:
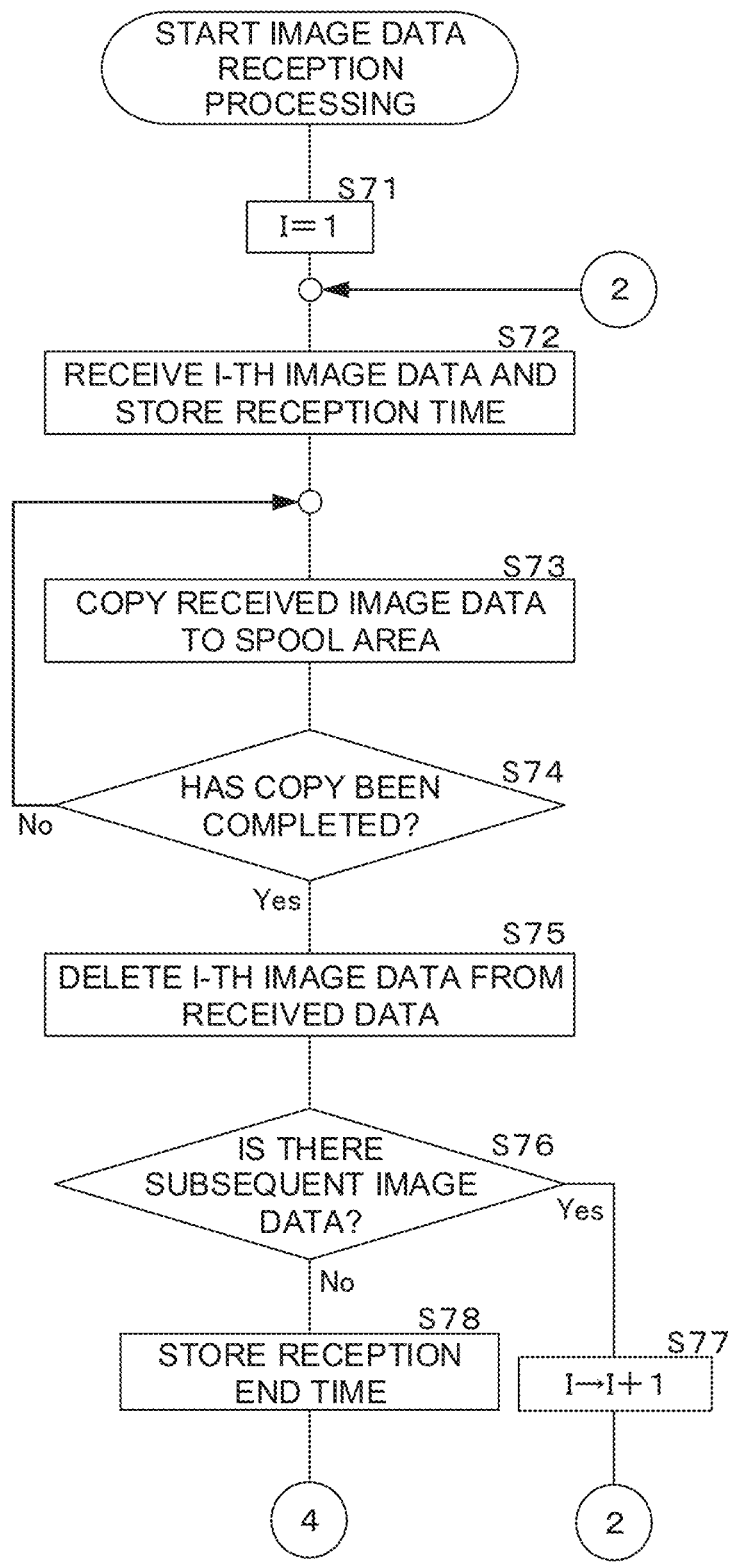
FIG. 15 is a flowchart illustrating a flow of image data transmission processing of a digital multifunction peripheral according to a third embodiment of the present invention.
Figure 16:
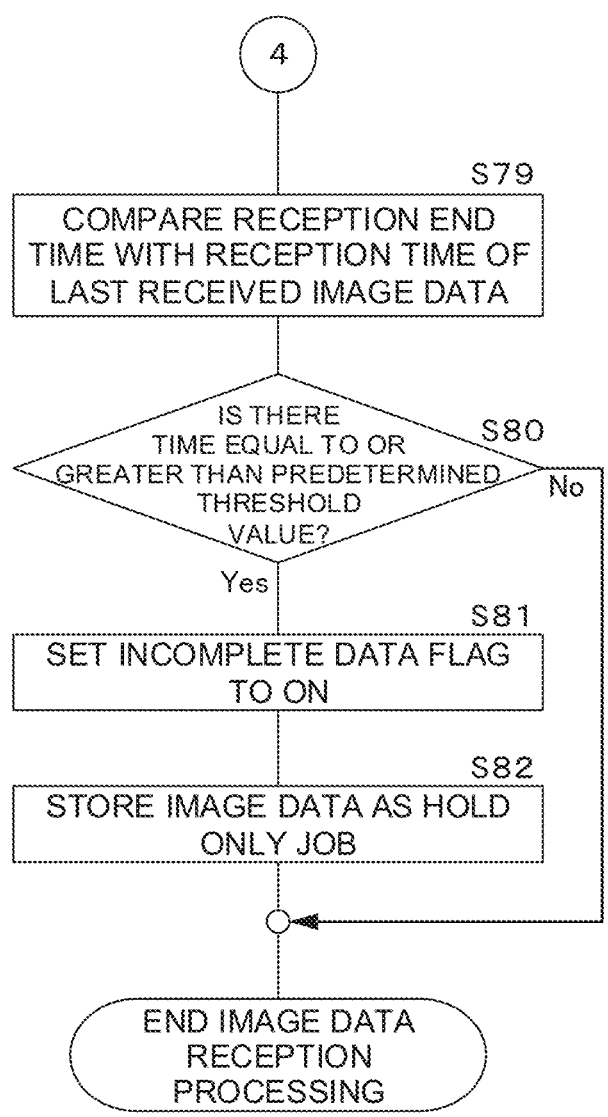
FIG. 16 is a flowchart illustrating a flow of the image data transmission processing of the digital multifunction peripheral according to the third embodiment of the present invention.

FIGS. 15 and 16 are a flowchart illustrating a flow of image data transmission processing of the digital multifunction peripheral 1 according to the third embodiment of the present invention.

Note that the processing of steps S71 to S78 of FIG. 15 and steps S79 to S81 of FIG. 16 corresponds to the processing of steps S41 to S48 of FIG. 11 and steps S49 to S51 of FIG. 12, respectively. Therefore, the description thereof will be omitted.

Here, the processing of step S82 of FIG. 16, not illustrated in FIGS. 11 and 12, will be described.

In step S81 of FIG. 16, the controller 100 sets the incomplete data flag to the job information for the received image data (step S81), in the following step S82, the controller 100 stores the image data as a hold only job in the storage 103 without printing the image data (step S82).

Figure 17:
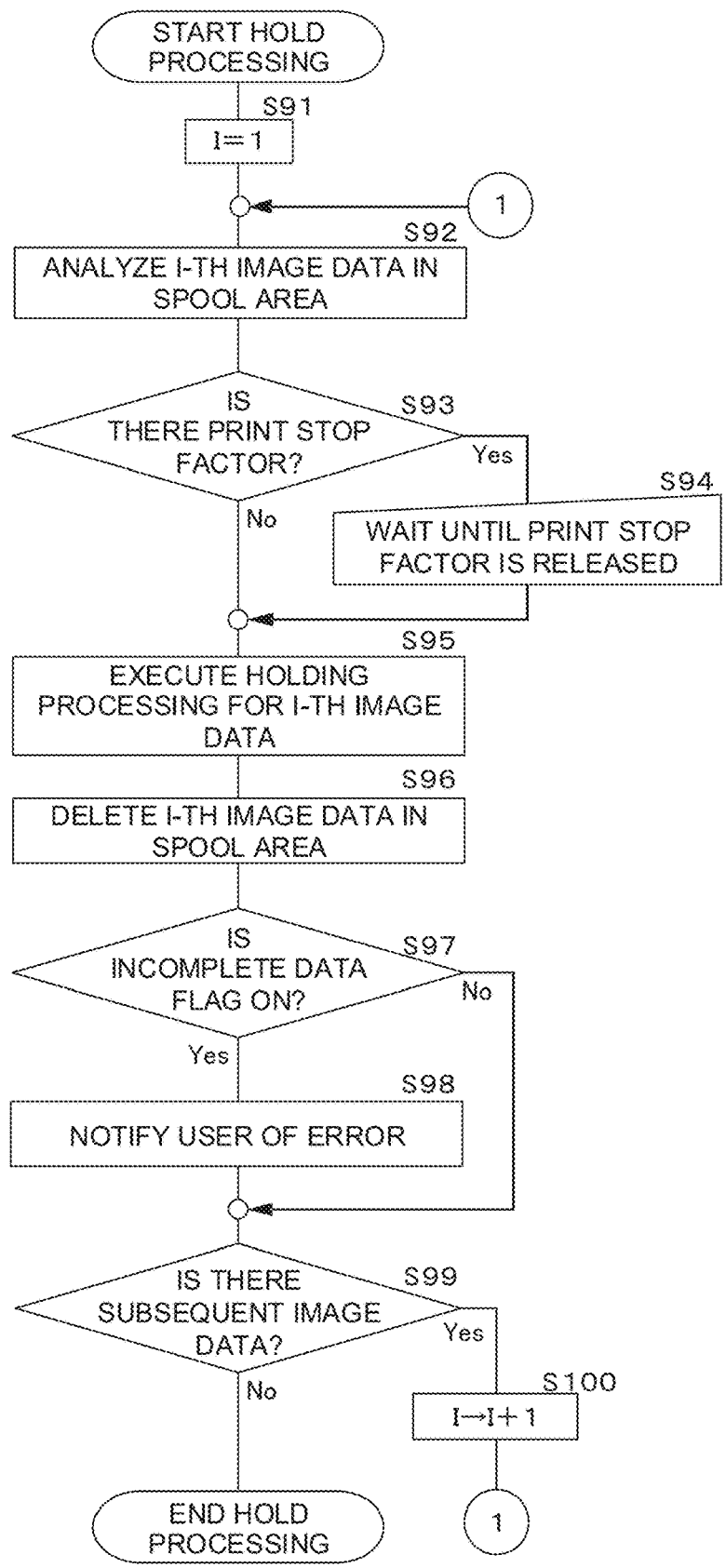
FIG. 17 is a flowchart illustrating a flow of hold processing of the digital multifunction peripheral according to the third embodiment of the present invention.

FIG. 17 is a flowchart illustrating a flow of hold processing of the digital multifunction peripheral 1 according to the third embodiment of the present invention.

Note that the processing of steps S91 to S94, S97, S99 and S100 of FIG. 17 corresponds to the processing of steps S61 to S64, S67, S69 and S70 of FIG. 13, respectively. Therefore, the description thereof will be omitted.

Here, the processing of steps S95, S96 and S98 of FIG. 17, which are not illustrated in FIG. 13 will be described.

In step S93 of FIG. 17, when there is no predetermined print stop factor (when the determination in step S93 is No), alternatively, when the print stop factor is released in step S94 (step S94), in step S95, the controller 100 executes holding processing for the I-th image data (step S95).

Subsequently, in step S96, the controller 100 deletes the I-th image data in the spool area (step S96).

Next, in step S97, when the job is a job in which the incomplete data flag is set (when the determination in step S97 is Yes), in step S98, the controller 100 notifies the user of an error (step S98).

For example, the controller 100 issues an error notification to the PC 2.

Further, the controller 100 may notify the display 1071 of the error message. Furthermore, the controller 100 may cause the image generator 102 to print the error message.

Figure 18:
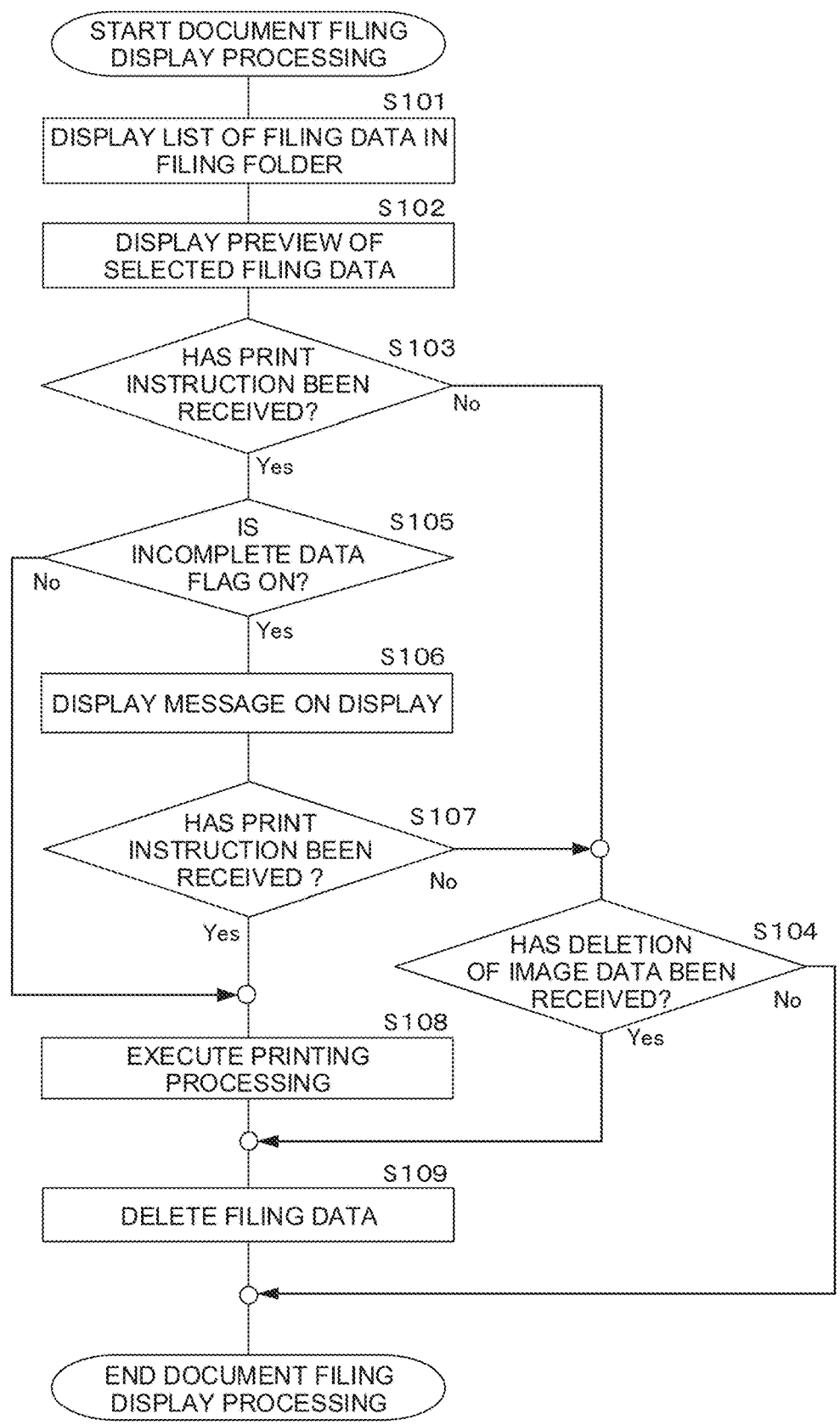
FIG. 18 is a flowchart illustrating a flow of document filing display processing of the digital multifunction peripheral according to the third embodiment of the present invention.
Figure 19A:
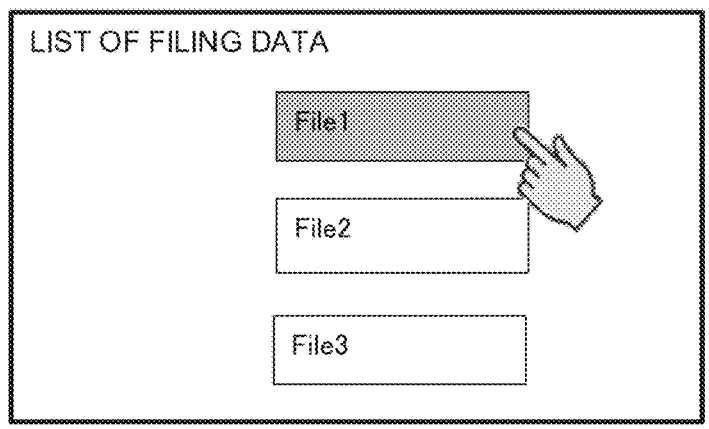
FIGS. 19A, 19B, and 19C are an explanatory diagrams illustrating an example of the document filing display processing of the digital multifunction peripheral according to the third embodiment of the present invention.
Figure 19B:
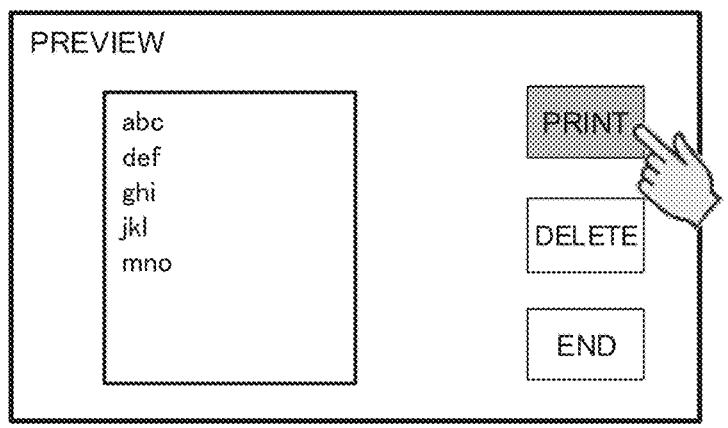
Figure 19C:
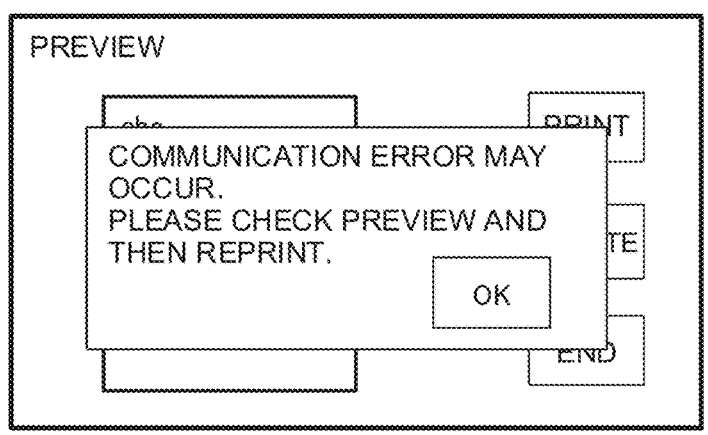

FIG. 18 is a flowchart illustrating a flow of document filing display processing of the digital multifunction peripheral 1 according to the third embodiment of the present invention. Further, FIGS. 19A, 19B, and 19C are explanatory diagrams illustrating an example of the document filing display processing of the digital multifunction peripheral 1 according to the third embodiment of the present invention. Furthermore, FIG. 20 is an explanatory diagram illustrating an example of printing processing of the digital multifunction peripheral 1 according to the third embodiment of the present invention.

In the third embodiment, it is assumed that the user has selected a document filing screen on the operator 1072 after the printing processing is completed.

In step S101 of FIG. 18, the controller 100 displays a list of filing data in a filing folder on the display 1071 (step S101).

In the example of FIG. 19A, the list of filing data ("File1", "File2", and "File3") is displayed on the display 1071.

Next, in step S102 of FIG. 18, the controller 100 displays a preview of the filing data selected by the user on the display 1071 (step S102).

Subsequently, in step S103, the controller 100 determines whether a print instruction has been received from the user (step S103).

In the example of FIG. 19B, the preview screen of "File1" is displayed on the display 1071, and the user can select either "print", "delete", or "end".

When the controller 100 has not received the print instruction from the user (when the determination in step S103 is No), the controller 100 determines in step S104 whether the deletion of the image data has been received (step S104).

In step S104, when the controller 100 receives the deletion of the image data (when the determination in step S104 is Yes), the controller 100 deletes the filing data from the storage 103 in step S109 (step S109).

On the other hand, when the controller 100 has not received, (cancel) the deletion of the image data (when the determination in step S104 is No), the controller 100 ends the document filing display processing.

Further, in step S103, when the controller 100 receives the print instruction from the user (when the determination in step S103 is Yes), in step S105, the controller 100 determines whether the job is a job in which the incomplete data flag is set by referring to the job information of the image data (step S105).

When the controller 100 determines that the incomplete data flag is set for the job (when the determination in step S105 is Yes), in step S106, the controller 100 displays an error message indicating that a communication error may have occurred on the display 1071 (step S106).

Thereafter, the controller 100 executes the determination in step S107 (step S107).

In the example of FIG. 19C, the display 1071 displays an error message indicating that the communication error may have occurred.

Please check the preview and then reprint, and the confirmation button (OK button).

On the other hand, in step S105 of FIG. 18, when the controller 100 determines that the job is not a job in which the incomplete data flag is set (when the determination in step S105 is No), in step S108, the controller 100 causes the image generator 102 to execute the printing processing (step S108).

Next, in step S107, the controller 100 determines whether a print instruction has been received from the user (step S107).

When the controller 100 receives a print instruction from the user (when the determination in step S107 is Yes), in step S108, the controller 100 causes the image generator 102 to execute the printing processing (step S108).

Subsequently, in step S109, the controller 100 deletes the filing data from the storage 103 (step S109), and then ends the document filing display processing.

On the other hand, in step S107, when the controller 100 has not received the print instruction from the user (when the determination in step S107 is No), in step S104, the controller 100 determines whether the deletion of the image data has been received (step S104).

As a result, as illustrated in FIG. 20, the controller 100 compares the reception end time of a series of image data with the reception time of the last received image data, consequently, stores the image data of the job N when the threshold value is equal to or higher than the predetermined threshold value, then notifies the user of the possibility of the occurrence of an error. Therefore, it is possible for the user to confirm the possibility of the occurrence of an error.

As describe above, the controller 100 notifies the user of the external device that the job may be an incomplete print result due to an error during reception of the image data, and stores the image data as hold image data in the storage without printing the image data. Therefore, it is possible to reduce wasteful printing and realize the image forming system 10 which is more convenient for the user than the conventional art.

The preferred embodiment of the present invention also includes the combinations of any of the plurality of embodiments described above.

In addition to the embodiments described above, there may be various modifications for the present invention. These variations should not be construed as not belonging to the scope of the present invention. The present invention should include meanings equivalent to the claims and all modifications within the claims.

What is claimed is:

1. An image forming device, comprising:
    a communicator that sequentially receives a series of image data from an external device via a network;
    a timer that measures a reception time of each of the series of image data;
    a storage comprising a spool area that temporarily stores each of the series of image data, which have been received, before an image is formed based on each of the series of image data;
    an image generator that forms an image based on each of the series of image data stored in the spool area; and
    a controller that controls the communicator, the timer, the storage, and the image generator,
    when the communicator receives image data, and subsequently does not receive the next image data within a predetermined reception time,
    the controller executes reception end processing for the series of image data, obtains the time difference between the time of the reception end and the reception time of the image data last received by the communicator,
        determines that there is a possibility that the last received image data is incomplete image data when the time difference is greater than or equal to a predetermined error determination time, and
        determines whether to cause the image generator to form an image based on the last received image data according to the result of the determination.

2. The image forming device according to claim 1, wherein when the controller determines that there is a possibility that the last received image data is incomplete image data, the controller causes the communicator to transmit an error notification to the external device, and deletes the last received image data from the storage without forming an image of the last received image data.

3. The image forming device according to claim 1, wherein when the controller determines that there is a possibility that the last received image data is incomplete image data, the controller causes the communicator to transmit an error notification to the external device, and the image generator to form an image based on the last received image data.

4. The image forming device according to claim 1, wherein when the controller determines that there is a possibility that the last received image data is incomplete image data, the controller stores the last received image data as hold image data in the storage, and causes the communicator to transmit an error notification to the external device.

5. The image forming device according to claim 4, the image forming device further comprising:
    an operator that receives an operation of a user; and
    a display that displays a message to the user,
    wherein when the operator receives an instruction indicating that an image should be formed based on the hold image data, the controller causes the display to display an error notification, and then causes the image generator to form an image based on the hold image data.

6. An image forming system comprising:
an external device; and
an image forming device connected to the external device via a network,
wherein the external device comprises:
    a device operator that receives an image forming instruction from a user;
    a device communicator that transmits a series of image data related to the image forming instruction to the image forming device;
    a device display that displays a notification to a user; and
    a device controller that controls the device operator, the device communicator, and the device display,
wherein the image forming device comprises:
    a communicator that receives a series of image data related to the image forming instruction from the external device via the network;
    a timer that measures a reception time of each of the series of image data;
    a storage comprising a spool area that temporarily stores each of the series of image data, which have been received, before an image is formed based on each of the series of image data;
    an image generator that forms an image based on each of the series of image data stored in the spool area; and
    a controller that controls the communicator, the timer, the storage, and the image generator,
wherein when the communicator does not receive next image data within a predetermined reception time predetermined by the communicator,
    the controller executes reception end processing for the series of image data, obtains the time difference between the time of the reception end and the reception time of the image data last received by the communicator,
    determines that there is a possibility that the last received image data is incomplete image data when the time difference is greater than or equal to a predetermined error determination time,
    determines whether to cause the image generator to form an image based on the last received image data according to the result of the determination, and causes the communicator to transmit an error notification to the external device, and
wherein the device controller causes the device display to display the error notification received by the device communicator from the image forming device.

* * * * *